(12) United States Patent
Wintz et al.

(10) Patent No.: US 12,172,846 B2
(45) Date of Patent: Dec. 24, 2024

(54) DETERMINING LOCATIONS AT WHICH TO STORE ITEMS IN A STORAGE FACILITY

(71) Applicant: Lineage Logistics, LLC, Irvine, CA (US)

(72) Inventors: Daniel Thomas Wintz, San Francisco, CA (US); Daniël Walet, Oakland, CA (US); Elliott Gerard Wolf, Oakland, CA (US)

(73) Assignee: Lineage Logistics, LLC, Irvine, CA (US)

( * ) Notice: Subject to any disclaimer, the term of this patent is extended or adjusted under 35 U.S.C. 154(b) by 391 days.

(21) Appl. No.: 17/831,379

(22) Filed: Jun. 2, 2022

(65) Prior Publication Data

US 2022/0388783 A1    Dec. 8, 2022

Related U.S. Application Data

(60) Provisional application No. 63/196,161, filed on Jun. 2, 2021.

(51) Int. Cl.
| | | |
|---|---|---|
| *B65G 43/08* | (2006.01) | |
| *B65G 1/04* | (2006.01) | |

(Continued)

(52) U.S. Cl.
CPC .............. *B65G 43/08* (2013.01); *B65G 1/04* (2013.01); *G06Q 10/047* (2013.01); *G06Q 10/087* (2013.01); *B65G 2203/0258* (2013.01)

(58) Field of Classification Search
CPC .. B65G 43/08; B65G 1/04; B65G 2203/0258; G06Q 10/047; G06Q 10/087; G06Q 10/08

See application file for complete search history.

(56) References Cited

U.S. PATENT DOCUMENTS 7,881,820 B2    2/2011 Antony et al.
8,855,806 B2 * 10/2014 Hara ................. G06Q 10/08
                                                          700/216

(Continued)

FOREIGN PATENT DOCUMENTS

CN    106241168    12/2016
CN    108292381    7/2018

(Continued)

OTHER PUBLICATIONS

Ariyanti et al., "The integrated method of warehouse layout and labor scheduling to reduce overtime", Proceeding of the International Conference on Industrial Engineering and Operations Management Bandung, 2008-2014, 2018.

(Continued)

*Primary Examiner* — Ramesh B Patel
(74) *Attorney, Agent, or Firm* — Barnes & Thornburg LLP

(57) ABSTRACT

Described herein are systems and methods for storing items in storage facilities. The method can include receiving, by a computing system, a request to identify a destination location for a storage item, identifying a set of available storage locations from among a plurality of storage locations, and determining a score for each respective storage location of the set of available storage locations based on multiple sub-scores specific to the respective storage location, to generate a set of scores corresponding to the set of available storage locations. The method also includes selecting a selected storage location from among the available storage locations based on the selected storage location having a most favorable score from among the set of scores corresponding to the set of available storage locations, and providing instructions to cause a mechanical moving system to route the storage item to the selected storage location.

23 Claims, 16 Drawing Sheets

(51) Int. Cl.
    *G06Q 10/04* (2023.01)
    *G06Q 10/047* (2023.01)
    *G06Q 10/08* (2024.01)
    *G06Q 10/087* (2023.01)

(56) References Cited

U.S. PATENT DOCUMENTS

| | | | |
|---|---|---|---|
| 9,280,756 B2* | 3/2016 | Hara | G06Q 10/087 |
| 10,133,990 B2 | 11/2018 | Hance et al. | |
| 10,504,061 B1 | 12/2019 | Shi | |
| 10,796,278 B1* | 10/2020 | Wintz | G06Q 10/0833 |
| 10,809,727 B1* | 10/2020 | Eckman | G05D 1/0212 |
| 10,926,952 B1 | 2/2021 | Shi et al. | |
| 10,943,210 B2 | 3/2021 | Hance et al. | |
| 10,956,858 B2 | 3/2021 | Jahani | |
| 10,984,378 B1* | 4/2021 | Eckman | G06K 19/06131 |
| 11,030,573 B2 | 6/2021 | Sikka et al. | |
| 11,157,841 B2 | 10/2021 | Hance et al. | |
| 11,436,560 B2 | 9/2022 | Wintz et al. | |
| 11,507,922 B1 | 11/2022 | Medidhi et al. | |
| 11,593,756 B2* | 2/2023 | Sikka | B65G 1/0492 |
| 2005/0229819 A1 | 10/2005 | Hollander et al. | |
| 2009/0082902 A1 | 3/2009 | Foltz et al. | |
| 2010/0164191 A1 | 7/2010 | Kinnen et al. | |
| 2011/0295412 A1* | 12/2011 | Hara | G06Q 10/08 |
| | | | 700/216 |
| 2011/0295413 A1* | 12/2011 | Hara | G06Q 10/087 |
| | | | 700/216 |
| 2013/0177379 A1 | 7/2013 | Hoffman et al. | |
| 2013/0226649 A1 | 8/2013 | Grissom | |
| 2014/0343713 A1 | 11/2014 | Ziegler et al. | |
| 2016/0185528 A1* | 6/2016 | Hara | G05B 15/02 |
| | | | 700/216 |
| 2017/0091349 A1 | 3/2017 | R M | |
| 2017/0091704 A1* | 3/2017 | Wolf | G06Q 10/08 |
| 2018/0068255 A1 | 3/2018 | Hance et al. | |
| 2018/0300435 A1* | 10/2018 | Eckman | G06Q 10/08 |
| 2019/0287053 A1 | 9/2019 | Tomoda et al. | |
| 2020/0034780 A1 | 1/2020 | Sikka et al. | |
| 2021/0150428 A1* | 5/2021 | Walet | G06Q 10/047 |
| 2021/0150461 A1 | 5/2021 | Wintz et al. | |
| 2021/0150473 A1* | 5/2021 | Wintz | G06Q 10/06315 |
| 2022/0366362 A1 | 11/2022 | Wintz et al. | |
| 2022/0388783 A1* | 12/2022 | Wintz | B65G 1/04 |
| 2022/0391828 A1* | 12/2022 | Wintz | G06Q 10/087 |

FOREIGN PATENT DOCUMENTS

| | | |
|---|---|---|
| CN | 109154799 | 1/2019 |
| CN | 110059992 | 7/2019 |
| CN | 111994535 B | 10/2021 |
| JP | 2002288248 A | 10/2002 |
| WO | WO2021/102111 | 5/2021 |

OTHER PUBLICATIONS

Bae, et al., "Acoustic scene classification using parallel combination of lstm and cnn," Proceedings of the Detection and Classification of Acoustic Scenes and Events 2016 Workshop (DCASE2106), 2016, pp. 11-15.
Chen, et al., "Sequencing the storages and retrievals for flow-rack automated storage and retrieval systems with duration-of-stay storage policy," International Journal of Production Research, 2016, 54(4):984-998.
Chen, et al., "The storage location assignment and interleaving problem in an automated storage/retrieval system with shared storage, International Journal of Production Research," 2010, 48(4):991-1011.
Cho, et al., Learning phrase representations using RNN encoder-decoder for statistical machine translation, CoRR/abs/1406.1078, 2014, 15 pages.
Chung, et al., "Empirical evaluation of gated recurrent neural networks on sequence modeling," arXiv preprint arXiv:1412.3555, 2014, 9 pages.
Donahue, et al., "Long-term recurrent convolutional networks for visual recognition and description," CoRR, abs/1411.4389, 2014, 14 pages.
Dos Santos and Gatti, "Deep convolutional neural networks for sentiment analysis of short texts," Proceedings of COLING 2014, the 25th International Conference on Computational Linguistics: Technical Papers, 2014, pp. 69-78.
Goetschalckx and Ratliff, "Shared storage policies based on the duration stay of unit loads," Management Science, 1990, 36(9):1120-1132.
Hausman, et al., "Optimal storage assignment in automatic warehousing systems," Management Science, 1976, 22(6):629-638.
He, et al., Deep residual learning for image recognition, CoRR, abs/1512.03385, 2015, 12 pages.
International Preliminary Report on Patentability in International Appln. No. PCT/US2020/061235, dated Jun. 2, 2022, 8 pages.
International Search Report and Written Opinion in International Application No. PCT/US2020/061235, dated Mar. 2, 2021, 12 pages.
Jaderberg, et al., "Reading text in the wild with convolutional neural networks," International Journal of Computer Vision, 2016, 116(1):1-20.
Johnson and Zhang, "Effective use of word order for text categorization with convolutional neural networks," arXiv preprint arXiv:1412.1058, 2014, 10 pages.
Johnson and Zhang, "Supervised and semi-supervised text categorization using lstm for region embeddings," arXiv preprint arXiv:1602.02373, 2016, 9 pages.
Kingma and Ba, "Adam: A method for stochastic optimization," arXiv preprint arXiv:1412.6980, 2014, 15 pages.
Kulturel, et al., "Experimental investigation of shared storage assignment policies in automated storage/retrieval systems," IIE Transactions, 1999, 31(8):739-749.
Li et al., "Dynamic storage assignment with product affinity and ABC classification—a case study", The International Journal of Advanced Manufacturing Technology 84(9): 2179-2194, 2015.
Malmborg, "Interleaving models for the analysis of twin shuttle automated storage and retrieval systems," International Journal of Production Research, 2000, 38(18):4599-4610.
Muppani and Adil, "Efficient formation of storage classes for warehouse storage location assignment: A simulated annealing approach," Omega, 2008, 36(4):609-618, Special Issue on Logistics: New Perspectives and Challenges.
Pennington, et al., "Glove: Global vectors for word representation," Empirical Methods in Natural Language Processing (EMNLP), 2014, pp. 1532-1543.
Petersen, et al., "Improving order-picking performance through the implementation of class-based storage," International Journal of Physical Distribution & Logistics Management, 2004, 34(7):534-544.
Rosenblatt and Eynan, "Note-deriving the optimal boundaries for class-based automatic storage-retrieval systems," Management Science, 1989, 35(12):1519-1524.
Schuster and Paliwal, "Bidirectional recurrent neural networks," IEEE Transactions on Signal Processing, 1997, 45(11):2673-2681.
Schwarz, et al., "Scheduling policies for automatic warehousing systems: Simulation results," AIIE Transactions, 1978, 10(3):260-270.
Srivastava, et al., "Dropout: a simple way to prevent neural networks from overfitting, The Journal of Machine Learning Research," 2014, 15(1):1929-1958.
Sutskever, et al., Generating text with recurrent neural networks, Proceedings of the 28th International Conference on Machine Learning (ICML-11), 2011, pp. 1017-1024.
Wang, et al., "End-to-end text recognition with convolutional neural networks," 21st International Conference on Pattern Recognition (ICPR), 2012, IEEE, 3304-3308.
Yu and Koster, "Designing an optimal turnover-based storage rack for a 3d compact automated storage/retrieval system," International Journal of Production Research, 2009, 47(6):1551-1571.

(56) References Cited

OTHER PUBLICATIONS

Yu and Koster, "On the suboptimality of full turnover-based storage," International Journal of Production Research, 2013, 51(6):1635-1647.
Yu, et al., "Class-based storage with a finite number of items: Using more classes is not always better, Production and Operations Management," 2015, 24(8):1235-1247.
Zhou, et al., "Text classification improved by integrating bidirectional lstm with two-dimensional max pooling," arXiv preprint arXiv:1611.06639, 2016, 11 pages.

* cited by examiner

DETERMINING LOCATIONS AT WHICH TO STORE ITEMS IN A STORAGE FACILITY

CROSS-REFERENCE TO RELATED APPLICATIONS

This application claims priority to and the benefit of U.S. Provisional Patent Application No. 63/196,161, filed Jun. 2, 2021, the entire content of which is incorporated herein by reference.

TECHNICAL FIELD

This document describes devices, systems, and methods related to putting away physical items in a storage facility.

BACKGROUND

Storage facilities, such as warehouses, receive physical items to be stored for an amount of time before being routed out of the storage facilities. The physical items can include pallets, cases, and other items that can be stored in the facilities before being sent to other destinations. The physical items can be moved around to different areas of the storage facilities. For example, storage facilities can have multiple levels and each level can have multiple storage locations. The facilities can also have multiple aisles with multiple storage locations. Some facilities can have cold storage areas or other temperature-based or characteristic-based storage areas. Some facilities can also have rooms where the physical items can be stored.

The physical items can be moved to storage locations in the facilities. The items can also be moved from one storage location to other storage locations in the facilities. Sometimes, characteristics of the items can be used to determine which storage locations the items can be moved to. The items can be moved around the facilities by human workers, forklifts, autonomous vehicles, cranes, carts, robots, or other devices or apparatus that may be used in the storage facilities. Sometimes, the storage facilities can become busy because of an amount of items coming into the facilities, an amount of items leaving the facilities, and/or an amount of items being moved around inside the facilities. Bottlenecks may arise, which can result in traffic inside the storage facilities.

SUMMARY

The document generally relates to technology for determining a storage location for physical items in a storage facility, such as a warehouse. The storage location can be determined by a system based on an aggregation of scores for one or more parameters that may impact a favorability for that storage location. Some of the parameters can include but are not limited to size of the storage location, weight capacity of the storage location, fill capacity of the storage location, and time to transport items through the storage facility and to the storage location. The parameters can also take into consideration whether moving the physical item to the storage location may cause impediments or bottlenecks in the storage facility. The storage location can be assigned an aggregate favorability score, based off the one or more parameters. The storage location's favorability score can be adjusted relative to favorability scores of other potential storage locations in the storage facility. A location with the most favorable score can be selected by the system. The physical item can then be routed to the location with the most favorable score.

Although the disclosed inventive concepts include those defined in the attached claims, it should be understood that the inventive concepts can also be defined in accordance with the following embodiments.

Embodiment 1 is a computer-implemented method to store a physical item in a storage facility, the method comprising: receiving, by a computing system, a request to identify a destination location in the warehouse for a storage item; identifying, by the computing system, a set of available storage locations from among a plurality of storage locations in the warehouse; determining, by the computing system, a score for each respective storage location of the set of available storage locations based on multiple sub-scores specific to the respective storage location, to generate a set of scores corresponding to the set of available storage locations; selecting, by the computing system, a selected storage location from among the available storage locations based on the selected storage location having a most favorable score from among the set of scores corresponding to the set of available storage locations; and providing, by the computing system, instructions to cause a mechanical moving system to route the storage item to the selected storage location.

Embodiment 2 is the method of embodiment 1, further comprising determining a sizing sub-score of the multiple sub-scores that are used to determine the score for each respective storage location of the available storage locations by: identifying, by the computing system, a size of the storage item; identifying, by the computing system, a size of the respective storage location; determining, by the computing system, an amount that the size of the respective storage location is larger than the size of the storage item; and assigning, by the computing system, the sizing sub-score based on the amount that the size of the respective storage location is larger than the size of the storage item, wherein the size of the storage item falls within a range from a minimum size of the respective storage location to a maximum size of the respective storage location.

Embodiment 3 is the method of any one of embodiments 1 or 2, wherein the computing system is configured to assign a more favorable sizing sub-score when the size of the respective storage location is equal to the size of the storage item than when the size of the respective storage location is larger than the size of the storage item.

Embodiment 4 is the method of any one of embodiments 1 through 3, further comprising determining a weight sub-score of the multiple sub-scores that are used to determine the score for each respective storage location of the available storage locations by: identifying, by the computing system, a weight of the storage item; identifying, by the computing system, a maximum weight capacity of the respective storage location; identifying, by the computing system, an aggregate weight of items currently stored at the respective storage location; determining, by the computing system, a remaining weight capacity of the respective storage location based on a difference between the maximum weight capacity and the aggregate weight of the items currently stored at the respective storage location; determining, by the computing system, an amount that the remaining weight capacity of the respective storage location exceeds the weight of the storage item; and assigning, by the computing system, the weight sub-score based on the amount that the remaining weight capacity of the respective storage location exceeds the weight of the storage item.

Embodiment 5 is the method of any one of embodiments 1 through 4, wherein the computing system is configured to assign a more favorable weight sub-score when the weight of the storage item is less than a predetermined threshold amount of weight of the remaining weight capacity of the respective storage location than when the weight of the storage item is greater than the predetermined threshold amount of weight.

Embodiment 6 is the method of any one of embodiments 1 through 5, wherein assigning the weight sub-score is based on items currently stored at the respective storage location having at least one of (i) a same type, or (ii) a same weight as the storage item.

Embodiment 7 is the method of any one of embodiments 1 through 6, further comprising determining a travel time sub-score of the multiple sub-scores that are used to determine the score for each respective storage location of the available storage locations by: determining, by the computing system, a first projected travel time between a current location of the storage item and the respective storage location; determining, by the computing system, a second projected travel time between the current location of the storage item and a second respective storage location; and assigning, by the computing system, a more favorable travel time sub-score when the first projected travel time is less than the second projected travel time than when the first projected travel time is greater than the second projected travel time.

Embodiment 8 is the method of any one of embodiments 1 through 7, wherein assigning the travel time sub-score is further based on (i) a wait time for storage items in a queue, (ii) a wait time for storage items at one or more lift mechanisms, (iii) a travel time for storage items in one or more lift mechanisms, (iv) a travel time for storage items through one or more mechanical moving systems, (v) an amount of traffic of storage items in the warehouse, (vi) an amount of time needed to pick the storage item after storage and deliver the storage item to a docking area, (vii) an amount of time needed to move the storage item from the respective storage location to a second destination in the warehouse, (viii) a quantity of items being currently stored at the respective storage location, (ix) an actual distance between the current location of the storage item and the respective storage location, or (x) an actual distance between the current location of the storage item and the second respective storage location.

Embodiment 9 is the method of any one of embodiments 1 through 8, further comprising determining, by the computing system, a type sub-score of the multiple sub-scores that are used to determine the score for each respective storage location of the available storage locations by: identifying, by the computing system, a type of the storage item; identifying, by the computing system, items having the same type as the storage item that are currently stored in locations in the warehouse; determining, by the computing system, a quantity of storage items having the same type as the storage item at the respective storage location; and assigning, by the computing system, the type sub-score to the respective storage location based on the quantity of the items that have the same type at the respective storage location exceeding a threshold value.

Embodiment 10 is the method of any one of embodiments 1 through 9, wherein identifying items having the same type as the storage item comprises identifying items having at least one of a same perishable date, storage temperature, SKU, customer identifier, product, outbound date, and delivery date as the storage item.

Embodiment 11 is the method of any one of embodiments 1 through 10, further comprising determining, by the computing system, a picking rate sub-score of the multiple sub-scores that are used to determine the score for each respective storage location of the available storage locations by: identifying, by the computing system, items currently stored in the respective storage location; determining, by the computing system, a picking rate for each of the items currently stored in the respective location; determining, by the computing system, a projected picking rate of the storage item; and assigning, by the computing system, the picking rate sub-score to the respective storage location based on the picking rate for each of the items currently stored at the respective storage location being less than the projected picking rate of the storage item.

Embodiment 12 is the method of any one of embodiments 1 through 11, wherein assigning the picking rate sub-score further comprises assigning a more favorable picking rate sub-score to the respective storage location when the projected picking rate of the storage item is greater than a second projected picking rate of a second storage item being routed to the respective storage location than when the projected picking rate of the storage item is less than or equal to the second projected picking rate of the second storage item being routed to the respective storage location.

Embodiment 13 is the method of any one of embodiments 1 through 12, further comprising determining, by the computing system, a fill capacity sub-score of the multiple sub-scores that are used to determine the score for each respective storage location of the available storage locations by: determining, by the computing system, a quantity of items currently stored at the respective storage location; determining, by the computing system and based on the quantity of items currently stored, a percent of fill capacity for the respective storage location; and assigning, by the computing system, the fill capacity sub-score based on the percent of fill capacity being less than a threshold value.

Embodiment 14 is the method of any one of embodiments 1 through 13, further comprising determining, by the computing system, a quantity moving sub-score of the multiple sub-scores that are used to determine the score for each respective storage location of the available storage locations by: receiving, by the computing system and from a plurality of sensors in the warehouse, information about items currently being moved in the warehouse; determining, by the computing system and based on the information about items currently being moved in the warehouse, a quantity of the items currently being moved in at least one of an aisle, the respective storage location, or the available storage locations; and assigning, by the computing system, the quantity moving sub-score based on the quantity of items being less than a threshold value.

Embodiment 15 is the method of any one of embodiments 1 through 14, wherein assigning the quantity moving sub-score is further based on (i) a number of items permitted in the aisle, the respective storage location, or the available storage locations at a given time, (ii) sizes of the items currently being moved in the aisle, the respective storage location, or the available storage locations, (iii) weights of the items currently being moved in the aisle, the respective storage location, or the available storage locations, (iv) types of the items currently being moved in the aisle, the respective storage location, or the available storage locations, or (v) a projected traffic time in the aisle, the respective storage location, or the available storage locations.

Embodiment 16 is the method of any one of embodiments 1 through 15, further comprising: receiving, by the computing system, real-time traffic conditions for the quantity of the items currently being moved; and adjusting, by the computing system, the quantity moving sub-score based on the real-time traffic conditions.

Embodiment 17 is the method of any one of embodiments 1 through 16, further comprising: determining, by the computing system, a first projected amount of time that the storage item would be stored in the respective storage location; determining, by the computing system and based on the real-time traffic conditions, a second projected amount of time to move the storage item to the respective storage location; and assigning, by the computing system, a more favorable quantity moving sub-score when the first projected amount of time being greater than the second projected amount of time than when the first projected amount of time is less than or equal to the second projected amount of time.

Embodiment 18 is the method of any one of embodiments 1 through 17, further comprising determining a compatibility sub-score of the multiple sub-scores that are used to determine the score for each respective storage location of the available storage locations by: identifying, by the computing system, a first set of characteristics about the storage item; identifying, by the computing system, a second set of characteristics about the respective storage location; and assigning, by the computing system, the compatibility sub-score based on one or more of the first set of characteristics being compatible with one or more of the second set of characteristics.

Embodiment 19 is the method of any one of embodiments 1 through 18, wherein the first set of characteristics include (i) a type of the storage item, (ii) a customer identification, (iii) a size of the storage item, (iv) a weight of the storage item, or (v) an amount of time for keeping the storage item in storage and the second set of characteristics include the respective storage location being (i) single deep, (ii) double deep, (iii) a drive-through rack, (iv) a drive-in rack, (v) automated, or (vi) manual.

Embodiment 20 is the method of any one of embodiments 1 through 19, wherein the compatibility sub-score is further based on (i) a quantity of forklifts moving items in the warehouse being greater than a first threshold value, (ii) a quantity of the available storage locations in the warehouse being greater than a second threshold value, (iii) a quantity of lift mechanism being greater than a third threshold value, (iv) a quantity of manual workers being greater than a fourth threshold value, or (iii) the warehouse being automated.

Embodiment 21 is a system for storing a physical item in a storage facility, the system comprising: a plurality of storage locations in the storage facility; a mechanical moving system configured to route items to the plurality of storage locations; and a computing system configured to: receive a request to identify a destination location in the storage facility for a storage item; identify a set of available storage locations from among the plurality of storage locations in the facility; determine a score for each respective storage location of the set of available storage locations based on multiple sub-scores specific to the respective storage location to generate a set of scores corresponding to the set of available storage locations; select a selected storage location from among the available storage locations based on the selected storage location having a most favorable score from among the set of scores corresponding to the set of available storage locations; and provide instructions to cause the mechanical moving system to route the storage item to the selected storage location.

Embodiment 22 is the system of embodiment 21, wherein the computing system is further configured to determine a sizing sub-score of the multiple sub-scores that are used to determine the score for each respective storage location of the available storage locations by: identifying a size of the storage item; identifying a size of the respective storage location; determining an amount that the size of the respective storage location is larger than the size of the storage item; and assigning the sizing sub-score based on the amount that the size of the respective storage location is larger than the size of the storage item, wherein the size of the storage item falls within a range from a minimum size of the respective storage location to a maximum size of the respective storage location.

Embodiment 23 is the system of embodiment 21 or 22, wherein the computing system is further configured to determine a weight sub-score of the multiple sub-scores that are used to determine the score for each respective storage location of the available storage locations by: identifying a weight of the storage item; identifying a maximum weight capacity of the respective storage location; identifying an aggregate weight of items currently stored at the respective storage location; determining a remaining weight capacity of the respective storage location based on a difference between the maximum weight capacity and the aggregate weight of the items currently stored at the respective storage location; determining an amount that the remaining weight capacity of the respective storage location exceeds the weight of the storage item; and assigning the weight sub-score based on the amount that the remaining weight capacity of the respective storage location exceeds the weight of the storage item.

The disclosed technology may provide one or more of the following technical advantages or effects. For example, the disclosed technology can reduce bottlenecks in a storage facility. A storage location can be selected for storing a physical item based on how much traffic exists or may exist along a route to the storage location. The disclosed technology can also compare traffic or other congestion information for traveling to different storage locations in order to determine which storage location has the least busy route. A storage location having a route with traffic can receive a less favorable score than a storage location having a route free of traffic. The disclosed technology can provide for selection of the storage location having the route free of traffic. Therefore, movement through the storage facility can be optimized, bottlenecks can be avoided, and traffic along one or more routes in the facility can be minimized. In other words, selecting a storage location can be based on current traffic flows in the facility. In some implementations, one or more inbound items can be slotted in a storage location nearest an inbound docking area, then defragmented later so that the disclosed technology can more efficiently handle outbound volumes. The disclosed technology can then determine favorable storage locations for the inbound items once the outbound volumes are resolved.

As another example, the disclosed technology can provide for improving overall facility efficiency. As mentioned above, traffic can be avoided or minimized. Therefore, inbound and outbound items can be moved more quickly throughout the facility. Storage space can also be optimized. For example, a storage location can be selected for storing a physical item based on the storage location having space that is closest to a size or shape of the physical item. Therefore, the storage location's space can be filled with the fitted physical item instead of having open spaces in the storage location that may not be filled with fitted physical items.

Similarly, the disclosed technology can provide for selecting storage locations that closely match an item's physical characteristics, such as height, size, and weight. Based on a combination of one or more parameters and a comparison of such combinations for each available storage location, a storage location that is the closest match to the physical item can be selected. Thus, storage space can be optimized.

As another example, picking rates in the facility can be improved. A storage location can be selected for storing a physical item based on items currently stored at the location having a lower picking rate than the physical item. In other words, if the physical item is going to be picked before the currently stored items, then the physical item can be stored in that location without compromising the picking rate for the other items.

As yet another example, the disclosed technology can provide for storing fast-moving items in easy-to-access locations. A storage location can be selected based on determining that a fast-moving item will be picked before items currently stored in that location. Therefore, storage of the fast-moving item in that location may not compromise picking rates of the items currently stored in that location. The storage location can also be selected based on the location being closer to an outbound docking area than other respective storage locations. Thus, based on combining one or more such parameters and comparing the combined parameters to parameters of other respective storage locations, the storage location can be selected as the most favorable storage location for the fast-moving item. When the fast-moving item is ready to be routed out of the facility, a travel distance between the storage location and the outbound docking area can be reduced. Thus, the item can be more quickly and efficiently moved in and out of the storage facility without causing bottlenecks or other inefficiencies in the storage facility.

The disclosed technology can also provide for easier and faster picking of like items. A storage location can be selected for a physical item from amongst available storage locations based on whether the storage location currently stores like items. Storing like items together can make it easier and more efficient for picking the items in bulk.

Moreover, the disclosed technology can provide for a holistic approach to selecting a storage location for a physical item. As described herein, one or more parameters can be scored per available storage location in the facility. The parameter scores can be compared relative to parameter scores of other available storage locations to determine the optimal or most favorable storage location for the physical item. Doing so can provide for optimizing space in the facility, avoiding bottlenecks, and improving overall efficiency of the facility.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to technology for selecting an optimal storage location for a physical item in a storage facility, such as a warehouse. In a manual and/or automated warehouse, the disclosed technology can be used to determine a current optimal storage location (e.g., putaway location) for a physical item, such as a pallet. The optimal storage location can be determined and selected once the physical item arrives in the warehouse (e.g., at an inbound docking area). The optimal storage location can also be modified or determined in real-time as the physical item is being moved in the warehouse and based on one or more changing conditions in the warehouse. The storage location can be determined based on a plurality of parameters that can be scored for the location relative to similar parameters of other available storage locations in the warehouse. Then, the storage location having a most favorable scoring can be selected and the physical item can be routed to that location.

As described herein, each available storage location in the facility can be assigned a favorability score for storing of a particular physical item. Different parameters or characteristics of each location can be weighted into the score such that the location having the most favorable score (e.g., a lowest cost) can be selected as a storage location for the physical item. Some of the parameters that are weighted in the favorability score include height of the location, height of the item, maximum weight the location can carry, weight of the item, picking rate or velocity of the location, picking rate or velocity of the item, distance from a current location of the item to the location, whether the location already stores items of a same type, whether putting the item in the location would violate a first-in-first-out (FIFO) order, a filling percent of the location, a number of items routed to a room or aisle of the location, a number of items already being moved to the location, a number of like items already stored in the room or aisle of the location, a location type, and information about other items waiting to be put away.

Any combination of these parameters can be weighted to determine the favorability score for each of the available storage locations. Moreover, values of the weighted parameters can vary per facility or warehouse. In some implementations, if a certain weighted parameter is not relevant to a particular facility, then that parameter may not be included in determining the favorability score for each of the available storage locations in the particular facility.

Figure 1:
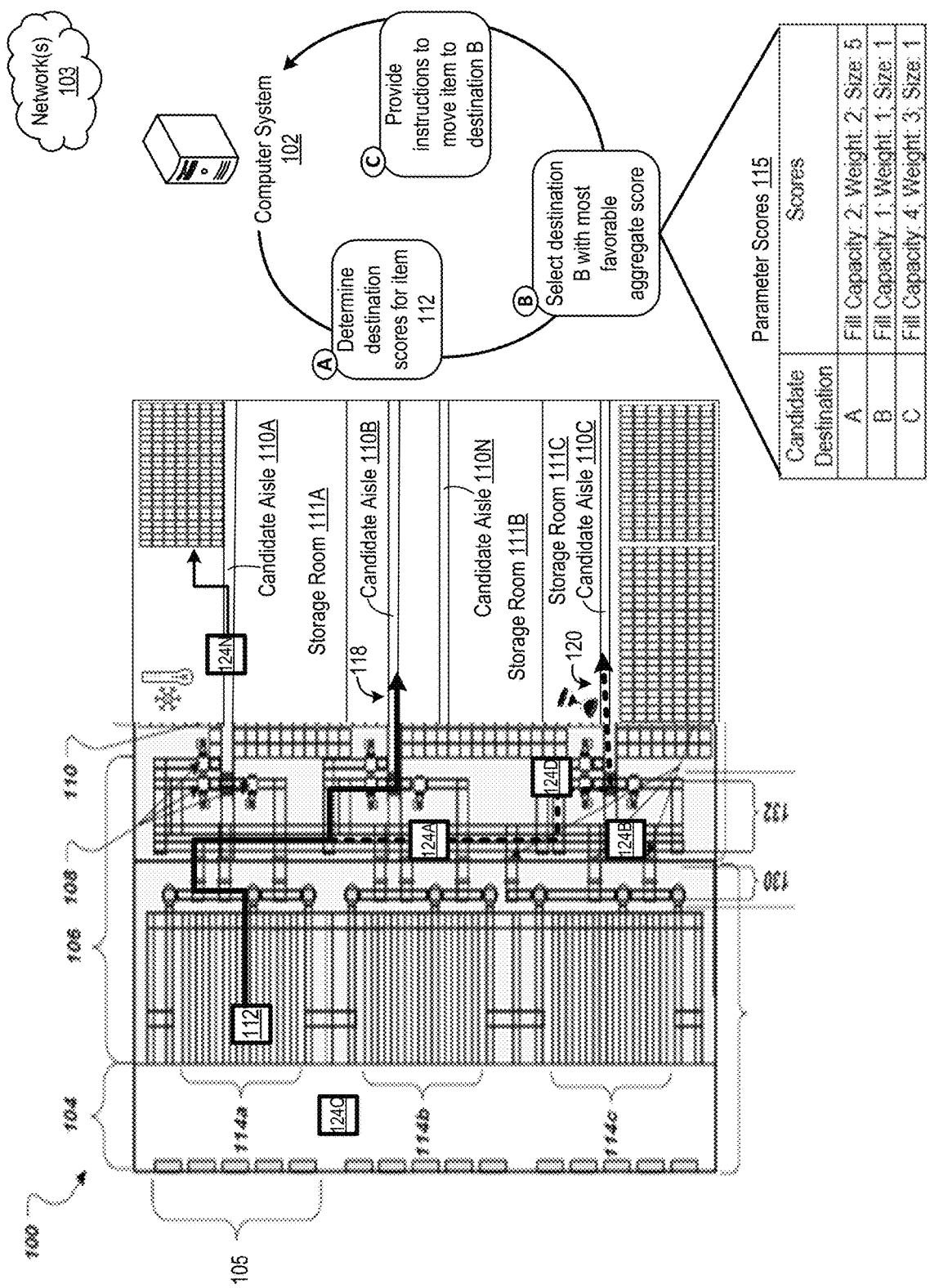
FIG. 1 is a conceptual diagram of a system for selecting a storage location for a physical item in a warehouse.

Referring to the figures, FIG. 1 is a conceptual diagram of a system for selecting a storage location for a physical item in a warehouse 100. A computer system 102 can be in communication with one or more components of the warehouse 100 (e.g., a warehouse management system, user devices, forklifts, lift mechanisms, conveyor belts, mechanical moving systems) via network(s) 103. The computer system 102 can be configured to select a storage location for a physical item based on weighing one or more parameters about the storage location relative to parameters about other available storage locations.

The warehouse 100 can include a docking area 104 having docking bays 105. Inbound items can be delivered to the docking area 104 by trucks that station at the bays 105. The inbound items can be routed through the warehouse 100 for storage in one or more storage locations. The warehouse 100 has a mechanical moving system 106, which can include conveyor belts 114A-C, 130, and 132. The mechanical moving system 106 can also include lift mechanisms (e.g., elevators) 108 that can be used to move items to different levels of the warehouse 100. The warehouse 100 has a storage area 110, which can include candidate aisles (e.g., storage locations) 110A-C. As shown in FIG. 1, the candidate aisles 110A-C can be specific locations within storage rooms 111A-C in the warehouse 100. In other examples, as shown in FIGS. 2A-G, the candidate locations 110A-C can be entire rooms in the warehouse 100. One or more fewer or additional candidate aisles and/or destination locations can be in the storage area 110. In some implementations, the storage area 110 can have multiple levels of candidate aisles and/or destination locations. In FIG. 1, storage room 111A has candidate aisle 110A, storage room 111B has candidate aisles 110A and 110N, and storage room 111C has candidate aisle 110C. Each of the candidate aisles 110A-N can have one or more carts configured to move items (e.g., the item 112, items 124A-N) up and down the aisles to rows alongside the aisles. In some implementations, the rows can be five rows deep for storing multiple items at a time. Once the items reach a determined destination aisle for storage, the cart associated with the determined destination aisle can stow, in either x or y directions, the item in one of the storage locations that make up the rows alongside the aisle. As shown in the room 111C, all storage locations alongside a right side of the aisle 110C are filled with items. As shown in the room 111B, none of the storage locations along either sides of the aisles 110B and 110N are filled with items.

As depicted in FIG. 1, the computer system 102 can determine a destination storage aisle for a physical item 112. The item 112 can be a pallet, boxes of items, container, or any other physical item for storage in the warehouse 100. The item 112 is received in the docking area 104 and placed on the mechanical moving system 114A, ready for storage in the warehouse 100.

In the example of FIG. 1, the computer system 102 can determine destination scores for the item 112 (Item A in FIG. 1). In other words, the computer system 102 can determine scores for one or more parameters for each of the candidate destination aisles 110A-N. The computer system 102 can determine an overall favorability score for each of the candidate aisles 110A-N based on weighting the parameter scores relative to the parameter scores of each of the candidate destination aisles 110A-N. As described herein, the parameters can include a fill capacity, weight, and size for each of the candidate destinations 110A-N. One or more fewer or additional parameters can also be used to determine an overall favorability score for each of the candidate destinations 110A-N.

Based on the parameter scores determined for each of the candidate destinations 110A-N, the computer system 102 can select candidate destination 110B as having a most favorable aggregate score for storing the item 112 (Item B). The most favorable score can be a lowest value score (e.g., 1) and a least favorable score can be a highest value score (e.g., 5, or any other number on a chosen favorability scale). In other implementations, the most favorable score can be a highest value score (e.g., 100) and a lowest favorable score can be a lowest value score (e.g., 0, or any other number or value on a chosen favorability scale).

In the example of FIG. 1, scores are determined on a scale of 1-5, with 1 being most favorable and 5 being least favorable. Parameter scores table 115 indicates parameter scores for each of the candidate destinations. Candidate destination 110A has a fill capacity score of 2, a weight capacity score of 2, and a size score of 5. Candidate destination 110B has a fill capacity score of 1, a weight capacity score of 1, and a size score of 1. Candidate destination 110C has a fill capacity score of 4, a weight capacity score of 3, and a size score of 1. Although not depicted in the table 115, the candidate destination 110N can also be assigned scores using the techniques described herein.

The computer system 102 can compare the individual parameter scores and/or an aggregate of the scores for each of the destinations 110A-N to determine a most favorable storage destination. Relative to the destinations 110A and 110C, the candidate destination 110B has a most favorable fill capacity score because the destination 110B has the lowest score value of 1. As shown in the warehouse 100, no items are stored alongside the destination aisle 110B.

Relative to the destinations 110A and 110C, the candidate destination 110B also has a most favorable weight capacity score, because the weight capacity score is 1. As shown in the warehouse 100, because the candidate destination 110B does not have any items currently stored there, the candidate destination 110B has a 100% capacity to take on weight of the item 112. The candidate destination 110C may have less than 50% capacity to take on weight of the item 112 because the destination 110C is currently storing many items and/or the items currently stored therein take up a certain amount of the weight capacity of destination 110C. Likewise, the candidate destination 110A may have less than 100% capacity but more capacity than the destination 110C. Therefore, relative to the destination 110C, the destination 110A can receive a more favorable weight score.

Relative to the destinations 110A and 110C, destination 110B also has a most favorable size score because the destination 110B has the lowest score value of 1. The destination 110A can have a least favorable size score of 5, even if the destination 110A still has some remaining fill capacity. This is because in some implementations, the destination 110A may not have space available that is closest to a size or shape of the item 112. The destination 110C can have a more favorable size score because, even though the destination 110C is operating at almost full fill capacity, the destination 110C has space available that is close to the size or shape of the item 112. To optimize space in the warehouse 100, the size score can be assigned based on whether a destination has an available space that matches as closely as possible to a size and/or shape of the item 112.

Once destination 110B is selected, the computer system 102 can provide instructions to the mechanical moving system 106 to move the item 112 to the candidate destination 110B (Item C). As depicted, the item 112 can be moved along a route 118 and down the candidate destination aisle 110B. One or more additional items 124A-N can also be routed through the warehouse 100 to the destination aisles 110A-N. The computer system 102 can determine a destination storage location for each of the items 124A-N.

In some implementations and in reference to the example in FIG. 1, the computer system 102 can also select the destination 110B for the item 112 based on traffic along the route 118 being less than traffic to either destination 110A or 110C. For example, if the item 112 were routed to candidate destination 110C along route 120, the item 112 would be moved along with items 124A, 124B, and 124D. Movement of these items can cause traffic along the route 120, thereby making the destination 110C a less favorable storage location for the item 112 in comparison to the candidate destination 110B.

In some implementations and in reference to the example in FIG. 1, the computer system 102 can also select the destination 110B for the item 112 based on the destination 110B having characteristics most compatible with the item 112. For example, the item 112 may not require cold storage. The candidate destination 110A can be a designated cold storage area, and therefore, the destination 110A can receive a less favorable score in comparison to the destinations 110B and 110C. Moreover, in some implementations, the computer system 102 can assign parameter scores to destination locations that are available for storing the item 112. For example, if a threshold requirement for availability is that the destination is not for cold storage, then the candidate destination 110A may not be considered an available storage location for the item 112. Thus, the computer system 102 may only determine parameter scores for the destinations 110B and 110C and select a most favorable storage location between 110B and 110C. One or more other threshold requirements can be used to determine which destination locations in the warehouse 100 are available and capable of storing the item 112.

FIGS. 2A-G depict factors that can be considered in selecting the storage location for the physical item 112, individually or in various combinations. As described herein, one or more additional or fewer factors can be weighted in determining a favorability score for each of the available storage or destination locations (e.g., refer to FIGS. 4A-J). In comparison to FIG. 1, FIGS. 2A-G provide another example layout of the warehouse 100 in which each of the candidate destinations 110A-C (e.g., storage locations) are rooms. The rooms can have multiple locations therein where the physical item 112 can be stored. Therefore, in the examples shown in FIGS. 2A-G, the candidate destinations 110A-C can be whole storage rooms. In other implementations, as shown in FIG. 1, the candidate destinations can be destination aisles in storage rooms and/or storage locations alongside the aisles in the storage rooms within the warehouse 100.

Figure 2B:
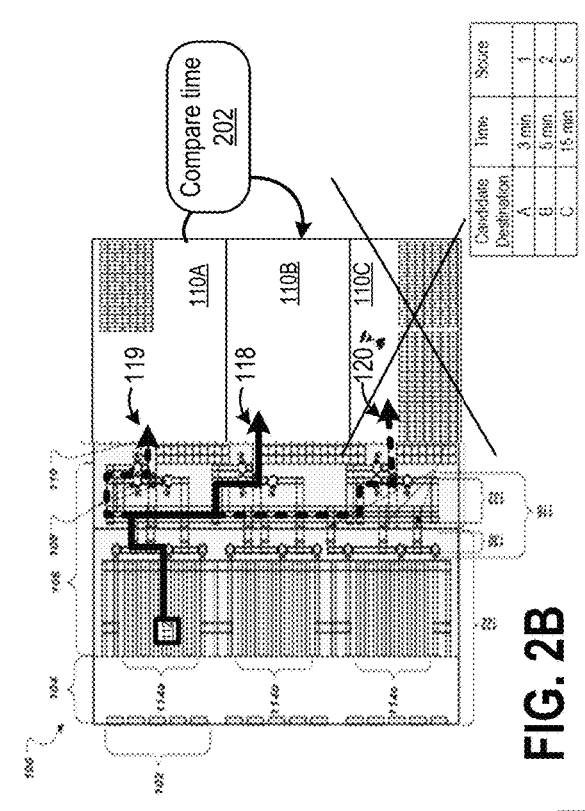
FIGS. 2A-G depict factors that are considered in selecting the storage location for the physical item.
Figure 2A:
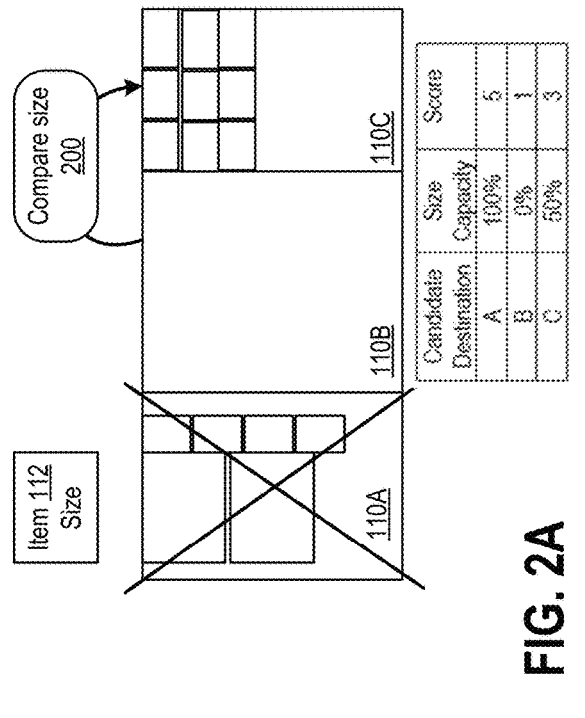
Figure 4A:
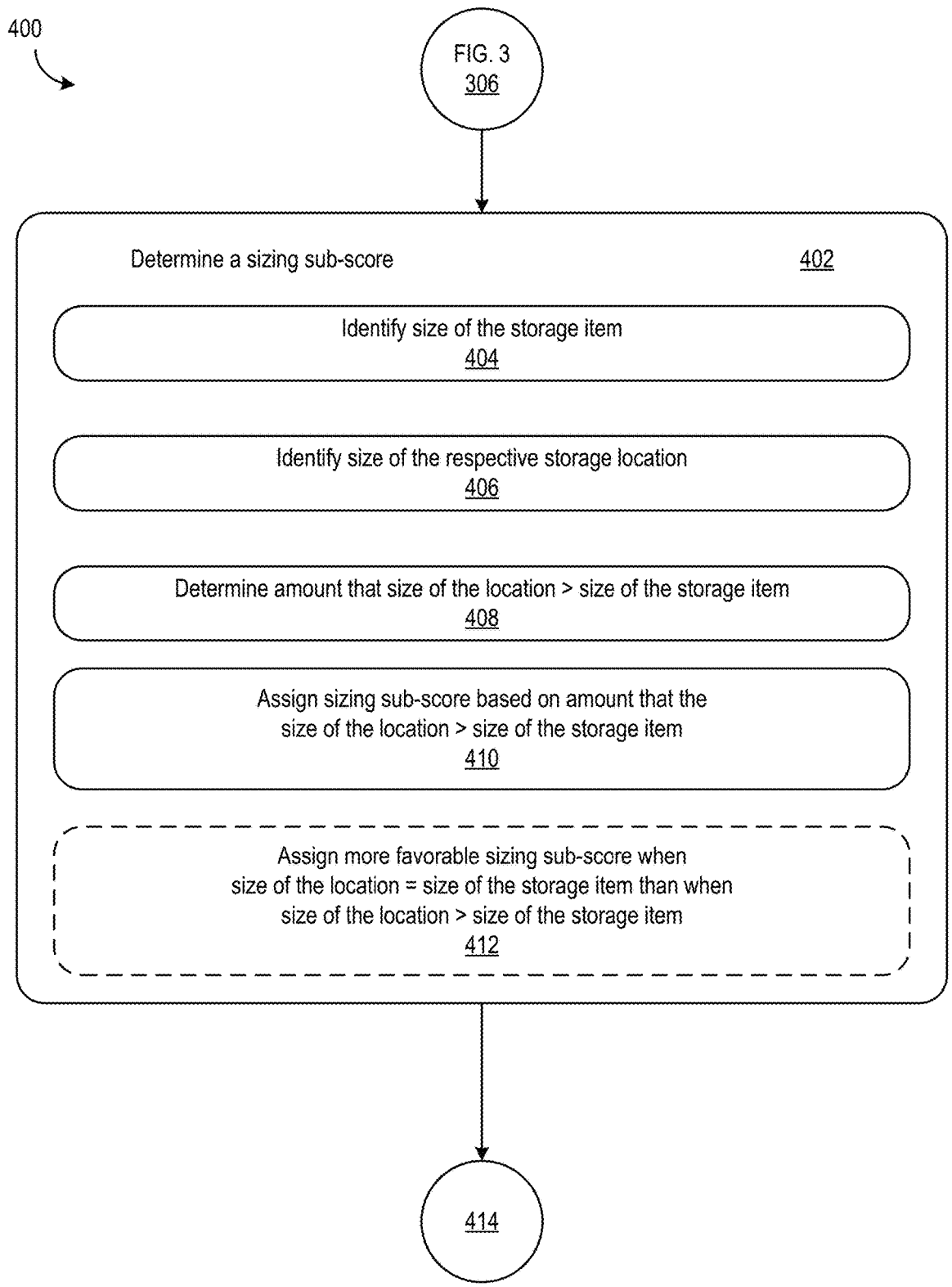
FIGS. 4A-J is a flowchart of a process for determining a favorability score for the storage location.

FIG. 2A is a conceptual diagram for determining a size score (e.g., refer to FIG. 4A). As depicted and described in further reference to FIG. 4A, a size of each available storage location (e.g., candidate destinations 110A-C) can be compared (200). In some implementations, an available storage location having a space closest in size to the item 112 size can be assigned a more favorable score than an available storage location having an available size that is too small or too large. In other implementations, an available storage location having the most amount of space available can receive a more favorable score than a storage location having less space available. As shown in FIG. 2A, candidate destination 110A is at 100% size capacity, meaning this destination cannot accommodate item 112 size. Therefore, destination 110A can be assigned a least favorable score of 5 and the size capacity of 110B and 110C can be compared (200). Destination 110B can receive a more favorable size score in comparison to destination 110C because destination 110B has 0% size capacity filled. In an example where destination 110C had an exact size available that matches the item 112 size, the destination 110C can be assigned the most favorable score. Storing the item 112 in destination 110C in that scenario can therefore result in optimizing on space in the storage facility.

In some examples, a height of the item 112 can be subtracted from a height of the destination storage location to identify an amount of extra height at the destination storage location. If the amount of extra height is equal to the height of the item 112, then that destination can be assigned the most favorable score. If, on the other hand, the amount of extra height is greater than the height of the item 112 by a certain predetermined threshold, then that destination can be assigned a less or least favorable score. One or more other calculations can be performed to determine whether the destination location has an available size for storing the item 112, as described further in FIG. 4A.

Figure 4B:
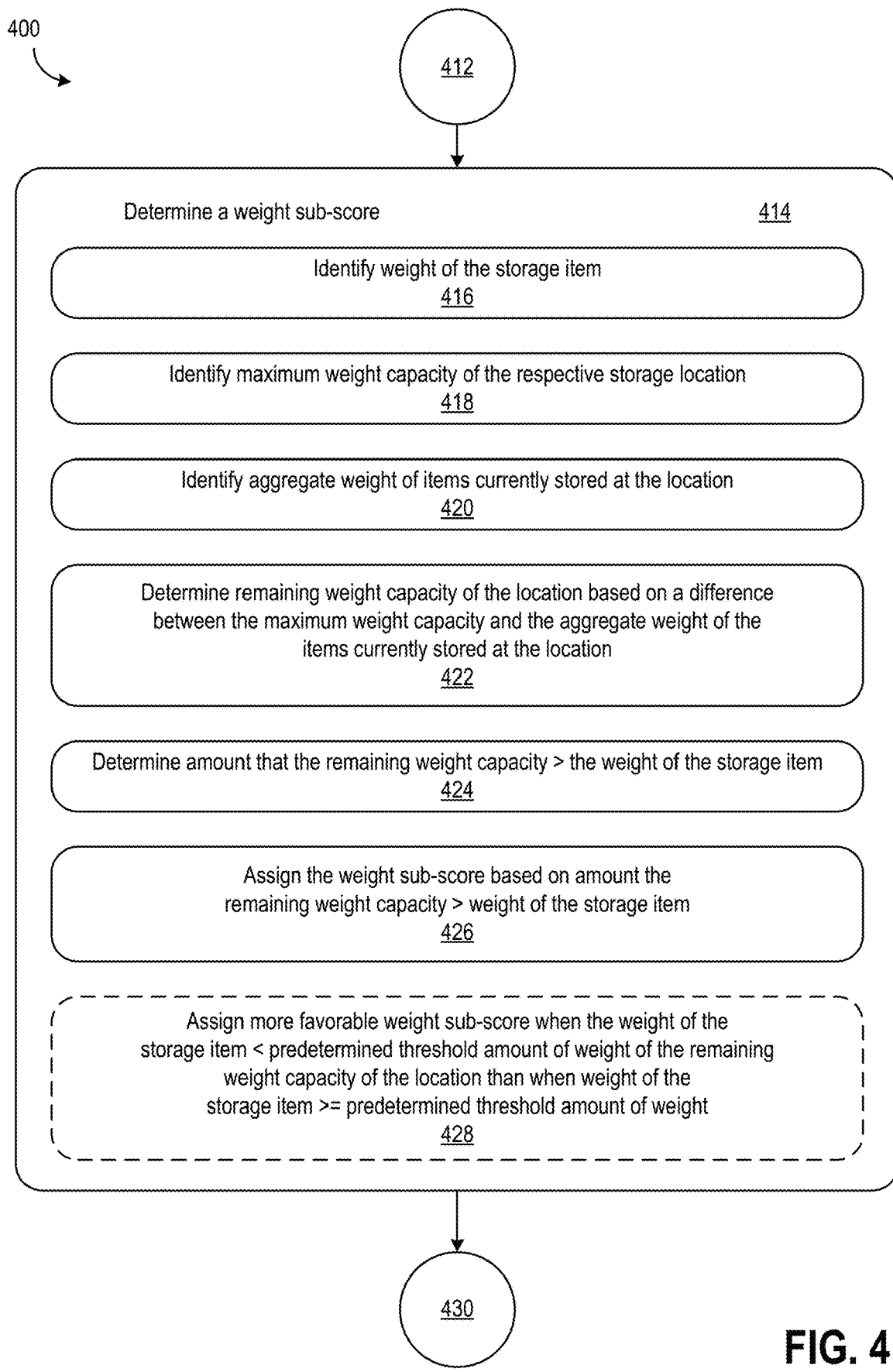
Figure 4C:
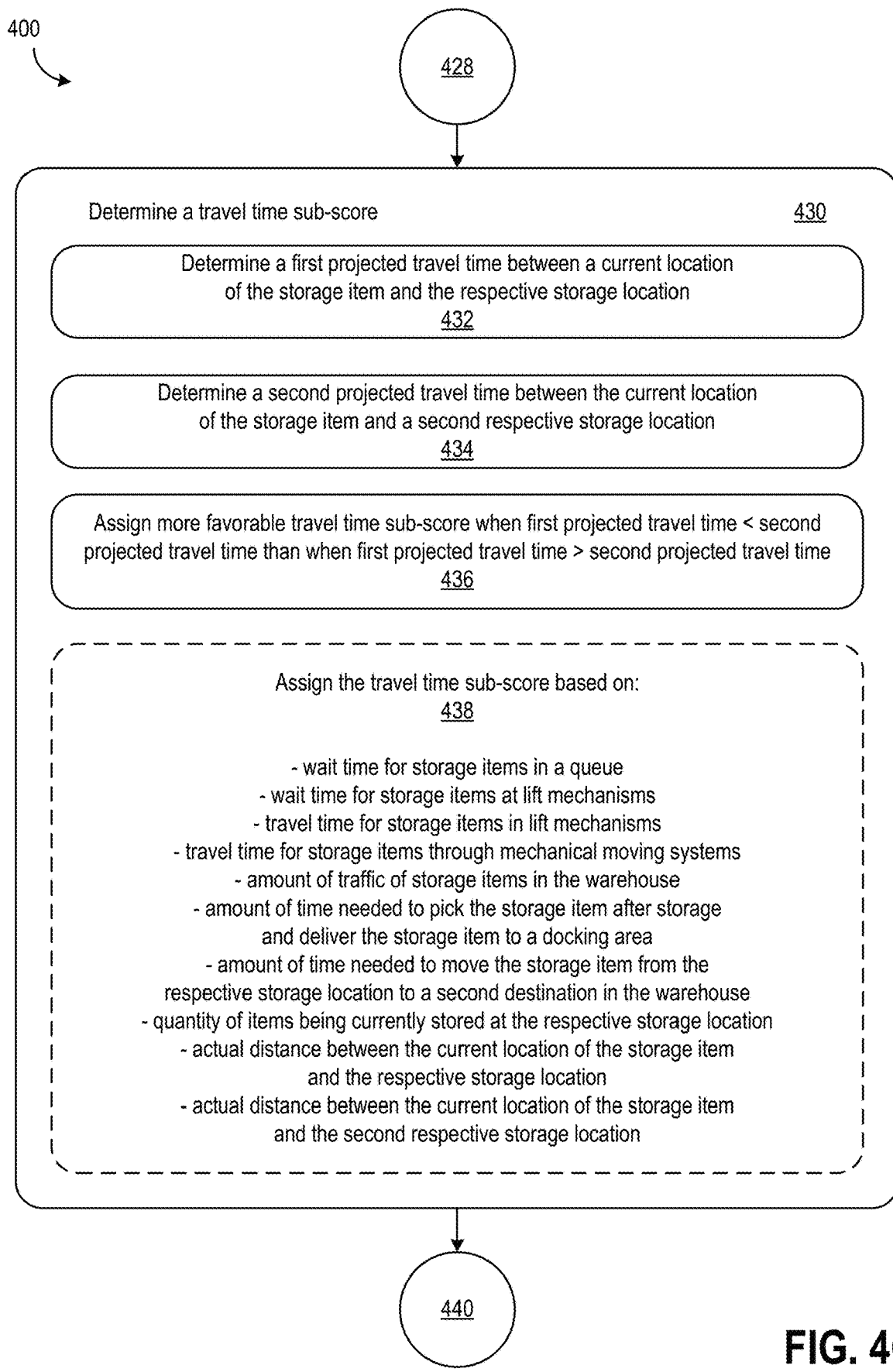
Figure 4D:
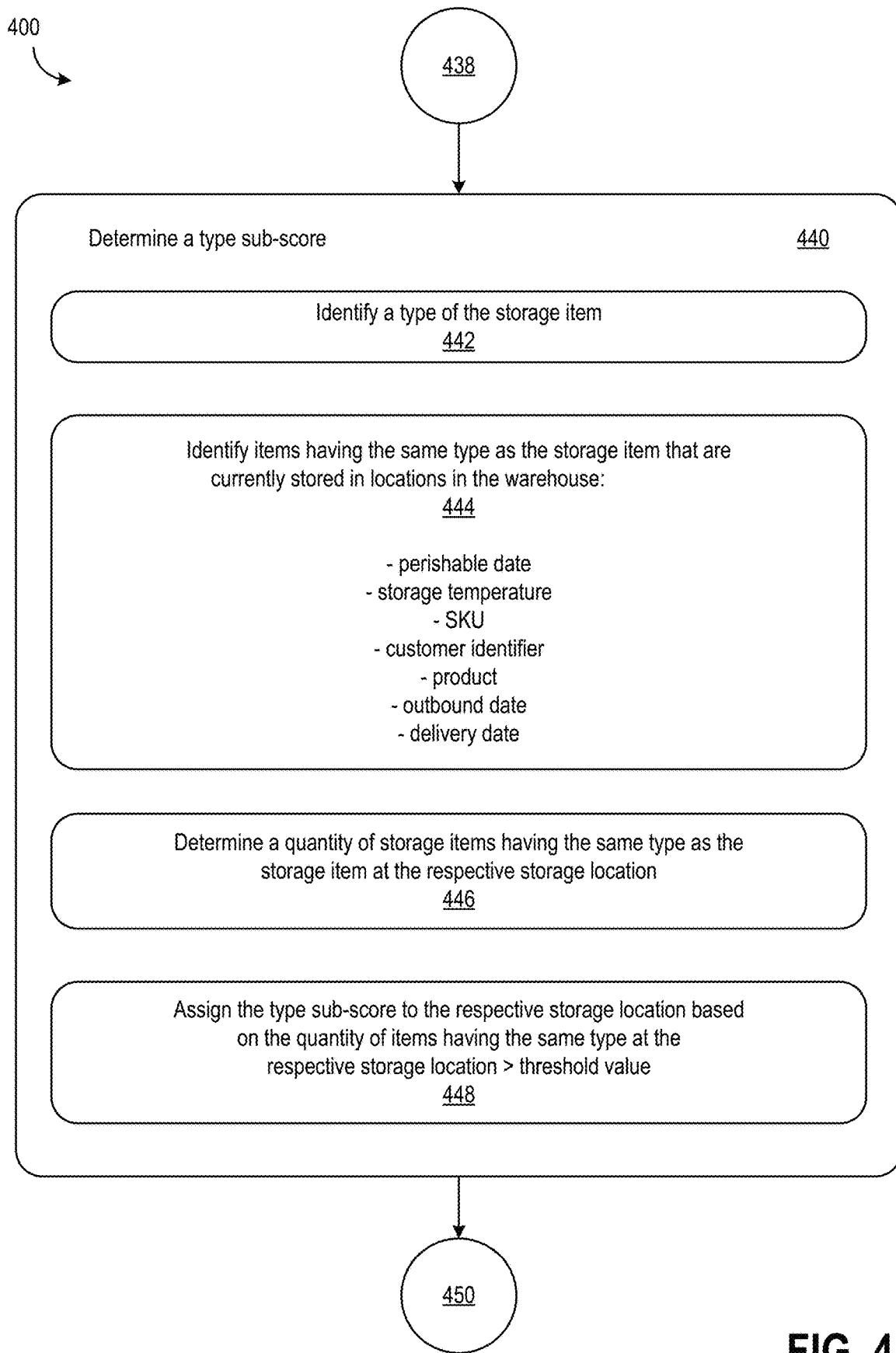
Figure 4E:
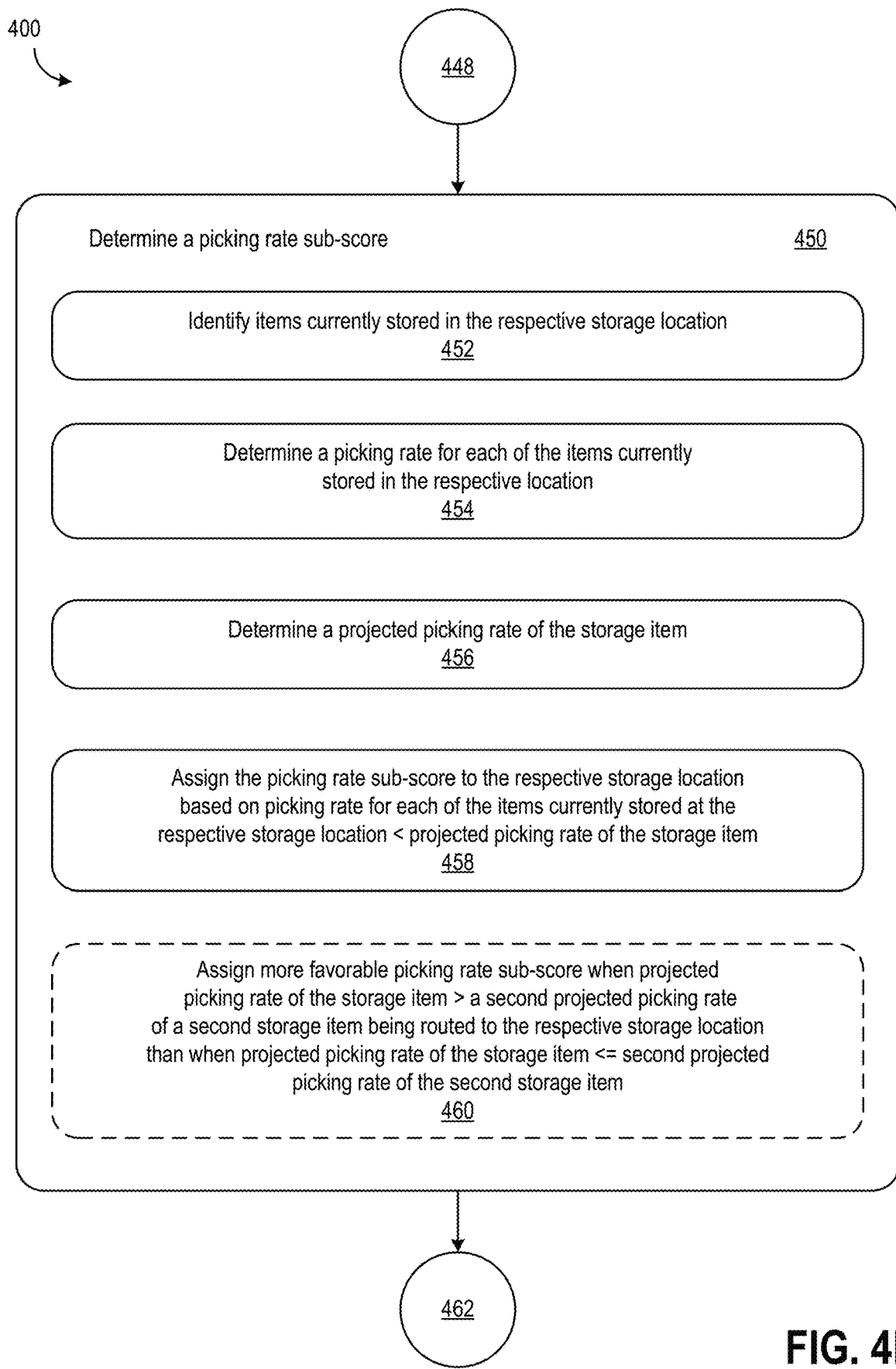
Figure 4F:
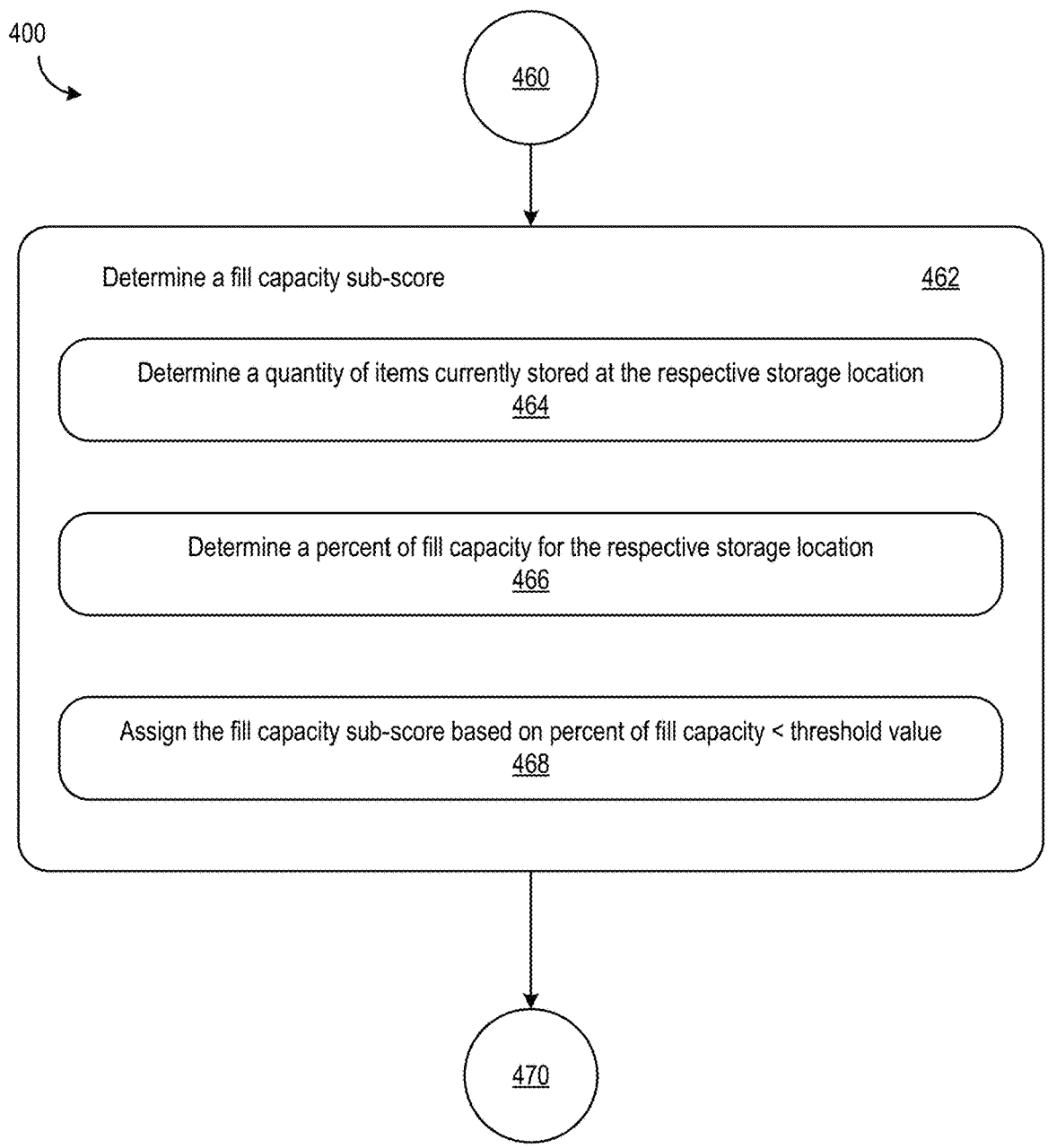
Figure 4G:
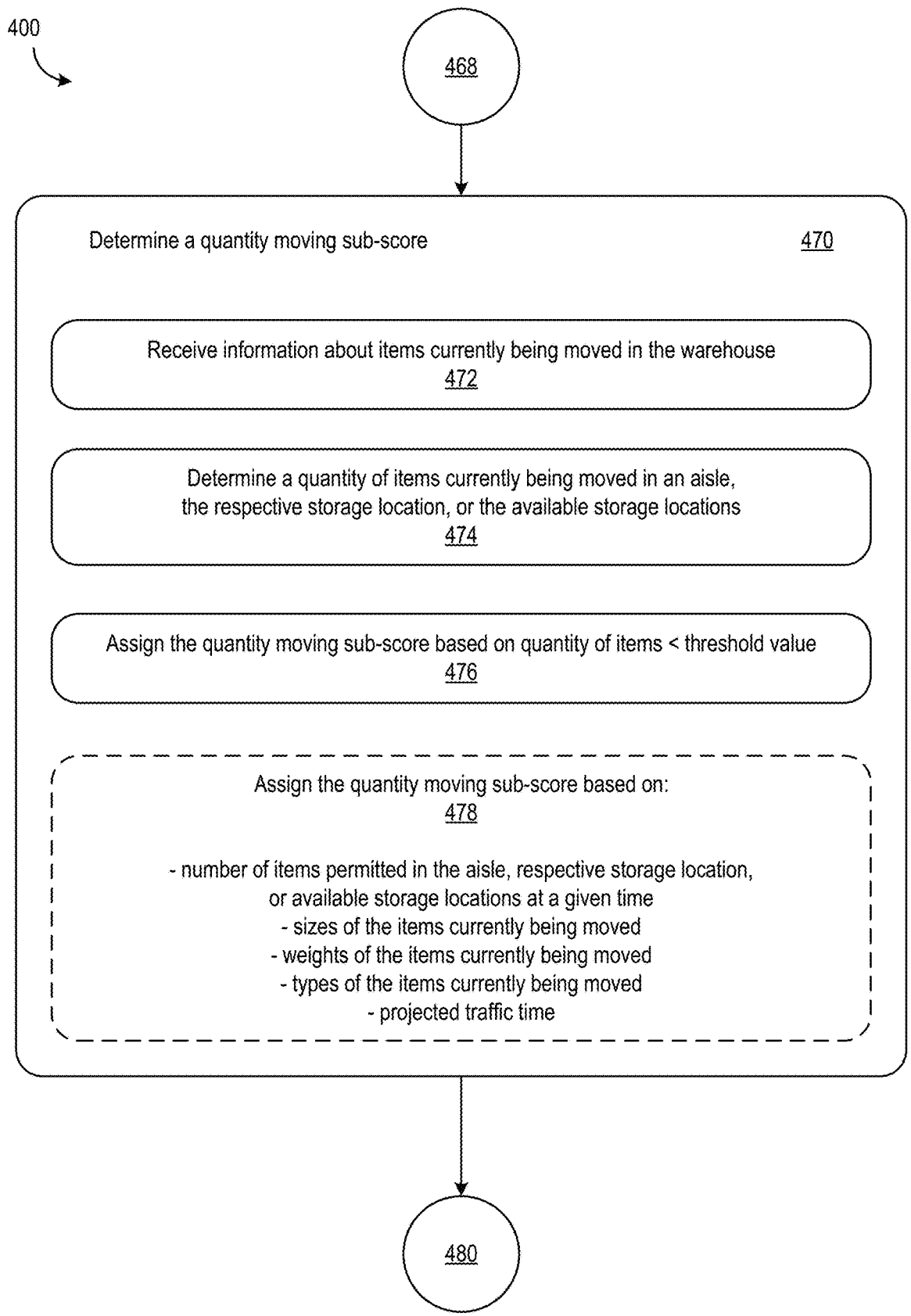
Figure 4H:
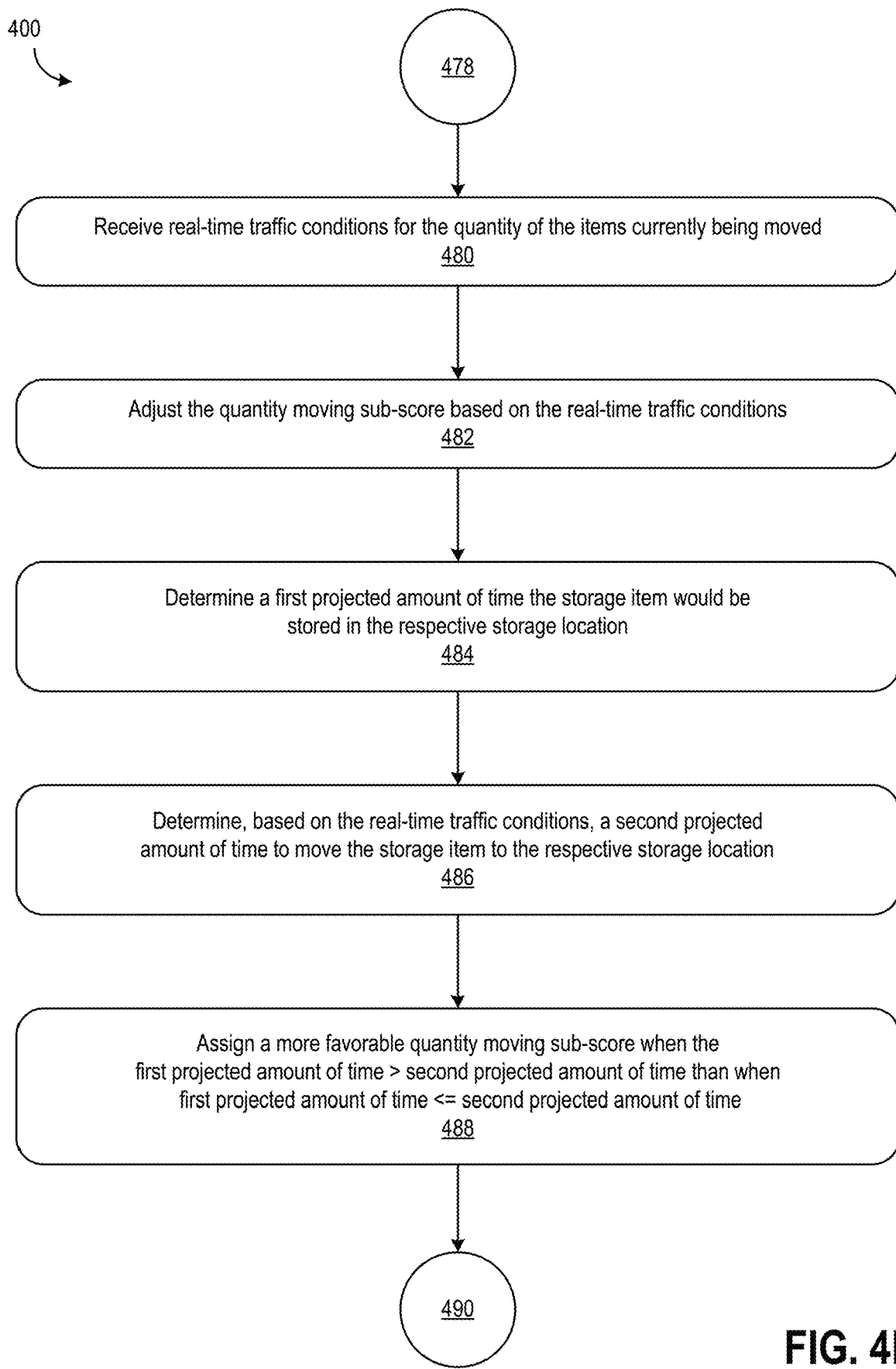
Figure 4I:
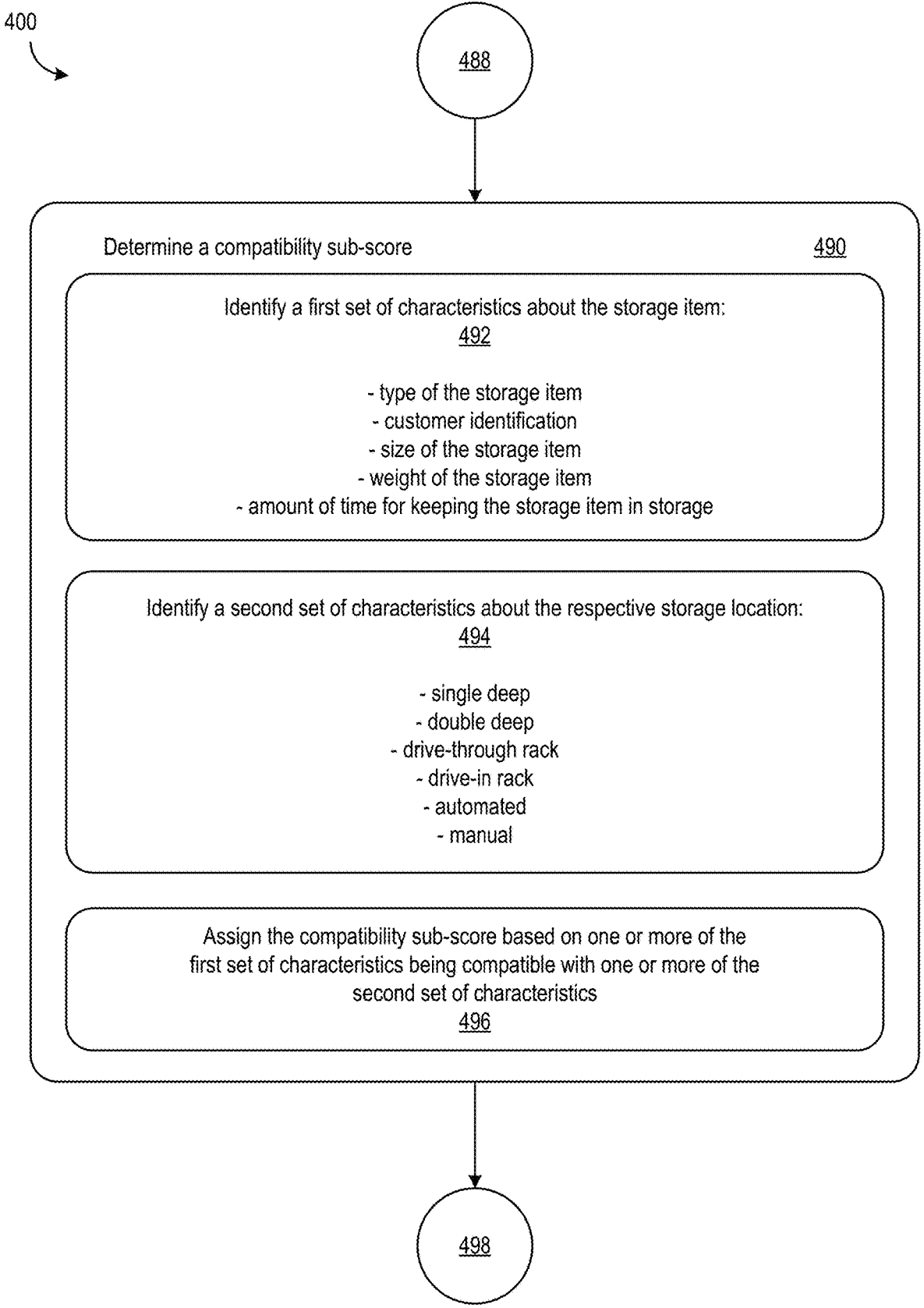
Figure 4J:
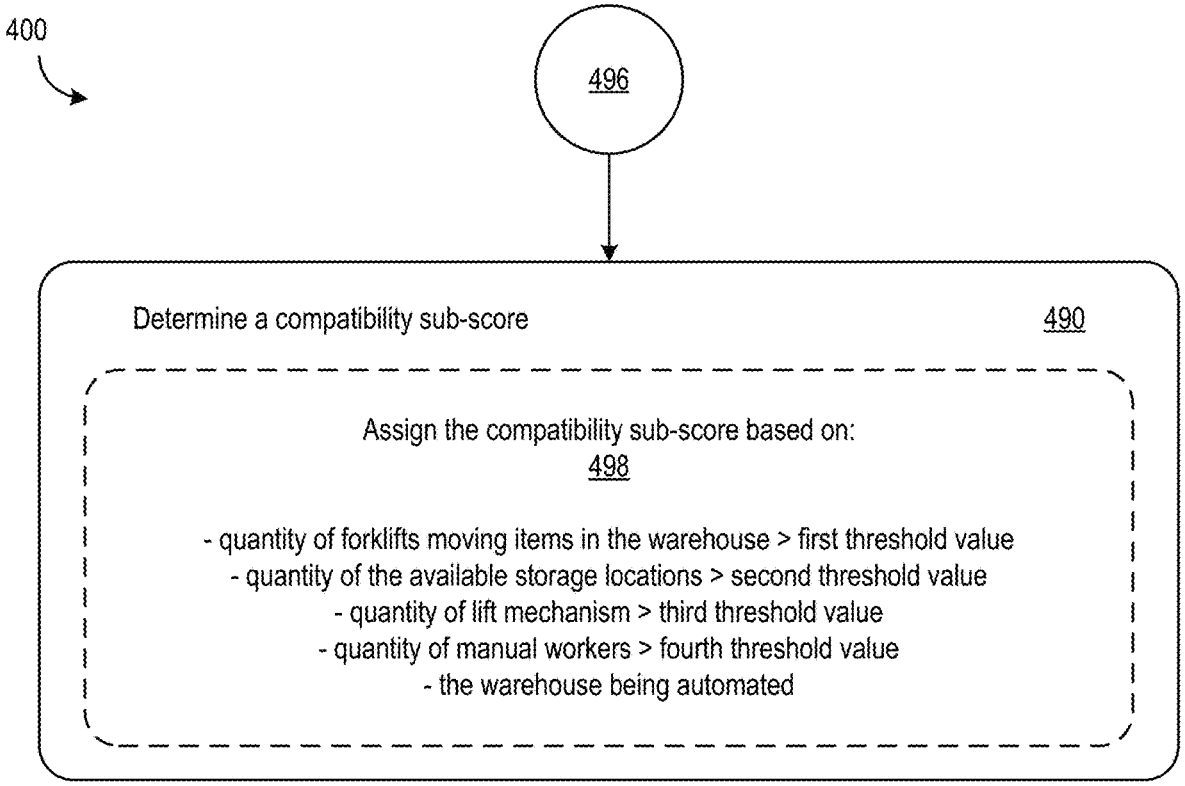

FIG. 2B is a conceptual diagram for determining a travel time score (e.g., refer to FIGS. 4C, 4H). As shown, the item 112 can be routed along three paths 119, 118, and 120. The route 120 can take the most amount of time to reach destination 110C, so destination 110C can be assigned a least favorable score of 5. Travel times for destinations 110A and 110B can therefore be compared (202). Destination 110A can be assigned the most favorable score for one or more reasons, as described in reference to FIGS. 4C and 4H. For example, the route 119 may not have any traffic, may have minimal traffic in comparison to the routes 118 and 120, may be a less frequented route for movement throughout the storage facility, the destination 110A may be closer to a current location of the item 112 than destinations 110B and 110C, and/or few or no items may currently be routed along the route 119.

In some examples, a first travel time can be determined for moving the item 112 to the destination 110A and a second travel time can be determined for moving the item 112 to the destination 110B. If the first time is less than the second time, then the destination 110A can be assigned the most favorable score. After all, it may take less time to move the item 112 to the destination 110A than to the destination 110B. One or more other calculations can be performed to determine which destination has the shortest travel time, as described further in FIGS. 4C and 4H.

Figure 2D:
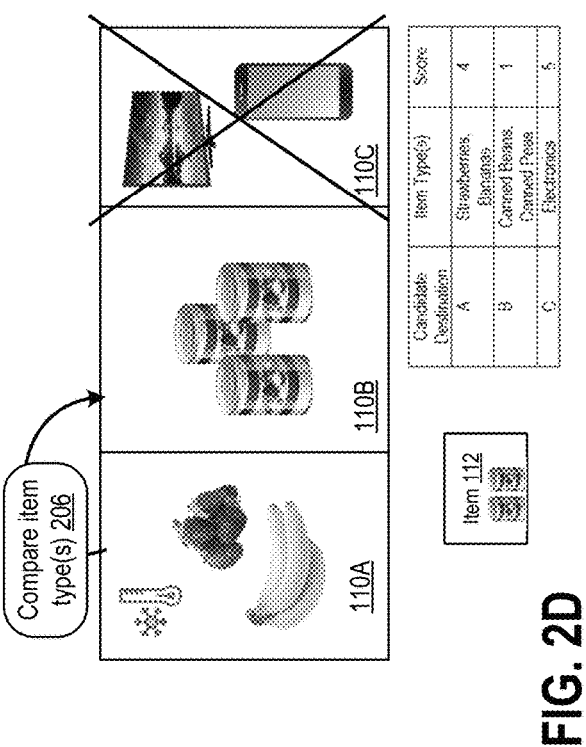
Figure 2C:
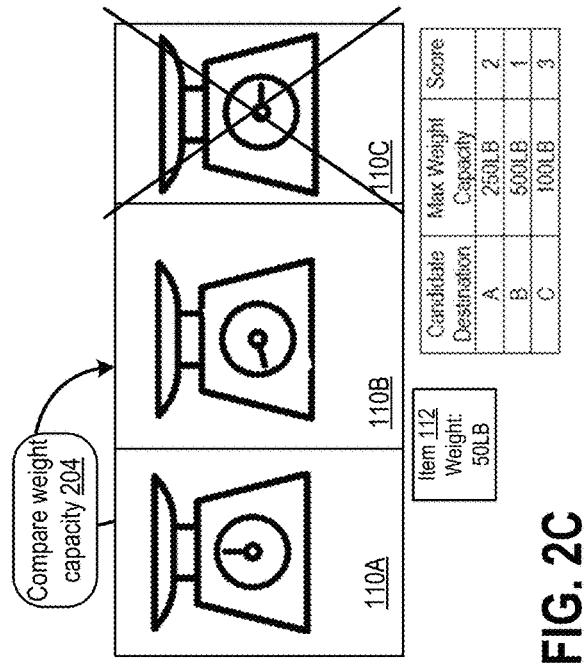

FIG. 2C is a conceptual diagram for determining a weight capacity score (e.g., refer to FIG. 4B). In the example of FIG. 2C, the item 112 weighs 501b. Destination 110C can have a remaining weight capacity of 100 lb. In comparison to weight capacity in destinations 110A and 110B, destination 110C has the least desirable weight capacity and therefore can be assigned a least favorable score. Weight capacities of destinations 110A and 110B can be compared (204). As described in reference to FIG. 1, the destination 110B may be empty and therefore has a maximum weight capacity of 500 lb. Therefore, this destination 110B can be assigned a most favorable weight score. In other implementations, and as described in reference to FIG. 4B, the weight favorability score can also be assigned based on which destination has an available weight capacity that is most similar or closest to the weight of the item. Therefore, space in the storage facility can be optimized.

FIG. 2D is a conceptual diagram for determining a type score (e.g., refer to FIG. 4D). Item 112 can be a pallet containing canned products/goods. Destination 110C can be used for storing electronics and other products that are not food. Therefore, destination 110C can be assigned a least favorable score since the item type of destination 110C is not a same item type as that of the item 112. The item type(s) of destinations 110A and 110B can be compared (206). Destination 110A can be a cold storage area and can store items such as strawberries, bananas, and other perishable foods. Destination 110B can be used for storing non-perishables, such as canned goods. Destination 110B can be assigned a more favorable score since this destination is used for storing items of a same or similar type as the item 112. In other implementations, and as described in reference to FIG. 4D, the item type score can be assigned based on which destination stores products that have the same storing conditions (e.g., require freezing or cold temperatures), same SKU, and/or same customer. A value assigned to the type score may be based on a quantity of same storing conditions a pallet has in combination with a candidate storage location (e.g., 3 of 5 categories). The categories may be weighted such that some have different weights, and some must be satisfied in order to be a candidate storage location (e.g., temperature and humidity requirements).

Figure 2F:
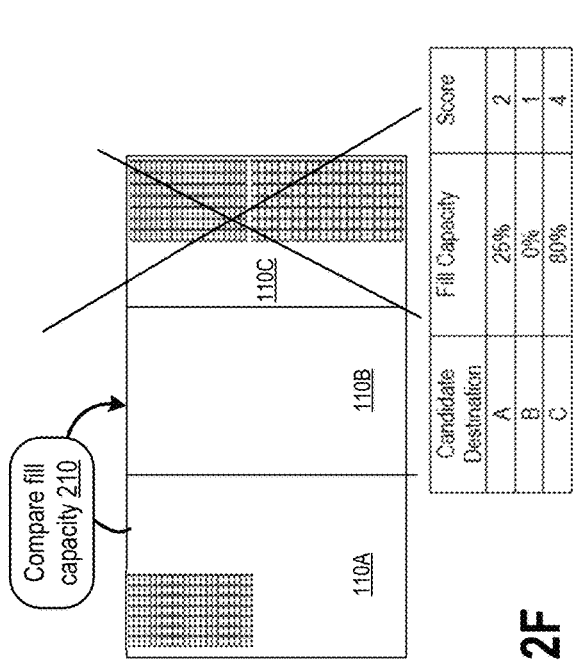
Figure 2E:
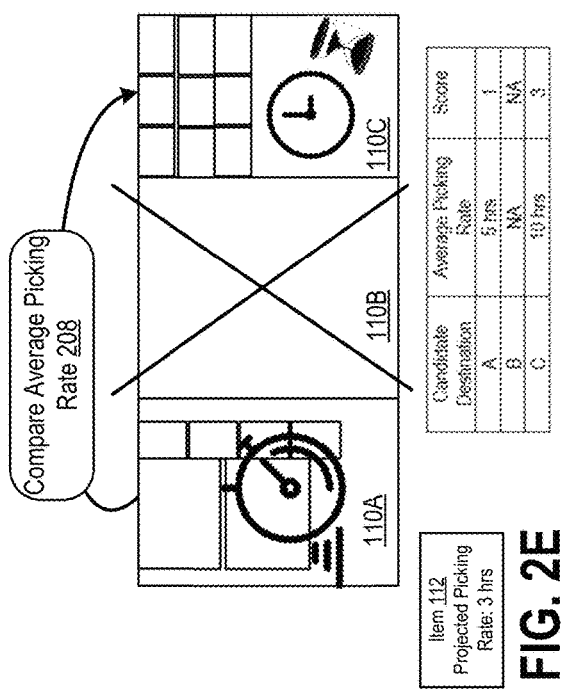

FIG. 2E is a conceptual diagram for determining a picking rate score (e.g., refer to FIG. 4E). The item 112 can have a projected picking rate of 3 hours. This projected picking rate can be determined based on historic data or information about moving similar or same items in and out of the storage facility. A picking rate can be an amount of time that an item is likely to remain in storage before it is picked for outbound shipment. The picking rate can alternatively or additionally include an amount of time needed to retrieve the item from storage and move it to an outbound area. As shown in FIG. 2E, destination 110B may not have an average picking rate score because no items are currently stored there. As a result, average picking rates for destinations 110A and 110C can be compared (208). The average picking rate per destination can be an aggregate or average of the picking rates for all the items currently stored in that destination. In this example, destination 110A has a shorter average picking rate than destination 110C and therefore is assigned a more favorable score. As described further in reference to FIG. 4E, the destination 110A can have a shorter average picking rate even though it is filled to a higher capacity because the items stored therein may be stored in the facility for short periods of time. The average picking rate for a destination can be longer based on whether the items stored therein remain in storage for longer. Moreover, in some implementations, the average picking rate can be longer for a destination that is farther away from an outbound area or a current location of an item that needs to be stored. In FIG. 2E, the item 112 has a projected picking rate of 3 hours, which is less than the average picking rate of destination 110A. Destination 110A is assigned a more favorable score because if the item 112 is stored there, the item 112 is likely to be picked before the items currently stored in destination 110A need to be picked.

The picking rate score can be based on a difference between the picking rate of the item to be stored and a combined picking rate of each candidate destination. Differences that are positive in value (combined rate at location is greater than rate of item to be stored) results in a more favorable score than negative differences. Still, there may an inflection point at which values assigned to positive differences may begin to decrease, such as once the difference starts to get too large (e.g., in some implementations, it may not be efficient to store an item with a low picking rate in a candidate storage location that has a significantly larger combined picking rate). Therefore, bottlenecks can be avoided and picking rates may not be negatively impacted by assigning inbound items to storage locations where items are currently being stored.

FIG. 2F is a conceptual diagram for determining a fill capacity score (e.g., refer to FIG. 4F). As shown in the example of FIG. 2F, the destination having 0% fill capacity (e.g., in other words, the destination is empty and therefore has the most amount of space available) can be assigned a most favorable score. One or more other factors, as described further in FIG. 4F, can be used to determine favorability in terms of the fill capacity score. As described in reference to FIG. 1, destination 110C is at 80% fill capacity. Even if the destination 110C has available space for the item 112, the destination 110C can be less favorable than the destinations 110A and 110B. Therefore, fill capacity can be compared (210) for destinations 110A and 110B. Since destination 110A is at 25% fill capacity and destination 110B is at 0% fill capacity (in other words, destination 110B is empty), destination 110B can be assigned the most favorable score for storing the item 112.

Figure 2G:
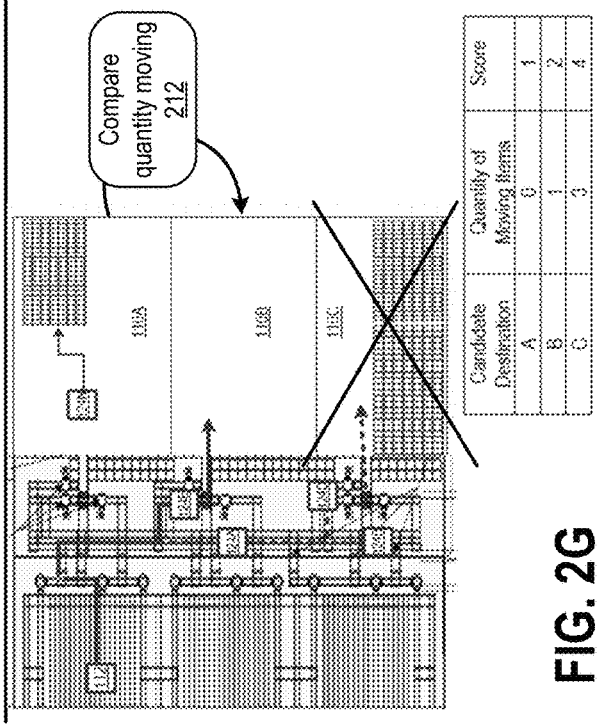

FIG. 2G is a conceptual diagram for determining a quantity moving score (e.g., refer to FIGS. 4G-H). As described in reference to FIGS. 4G-H, the quantity moving score can be based on how many items are currently being routed to a storage location, how many items are assigned to a storage location, and/or real-time traffic conditions to a storage location. A storage location having the least amount of items currently being routed there can be assigned a most favorable score. In FIG. 2G, three items are being routed to destination 110C. Destination 110C can receive a least favorable score since it has the most amount of items currently being routed there in comparison to the destinations 110A and 110B. Therefore, the quantity of moving items to the destinations 110A and 110B can be compared (212). No items are currently being moved to destination 110A, so this destination can receive a more favorable score than the destination 110B, which has 1 item moving there.

One or more of the scores described in reference to FIGS. 2A-G can be combined to determine an aggregate or overall favorability score per available storage location. The location having the most favorable score can be selected for the item and the item can be routed to that location for storage.

Figure 3:
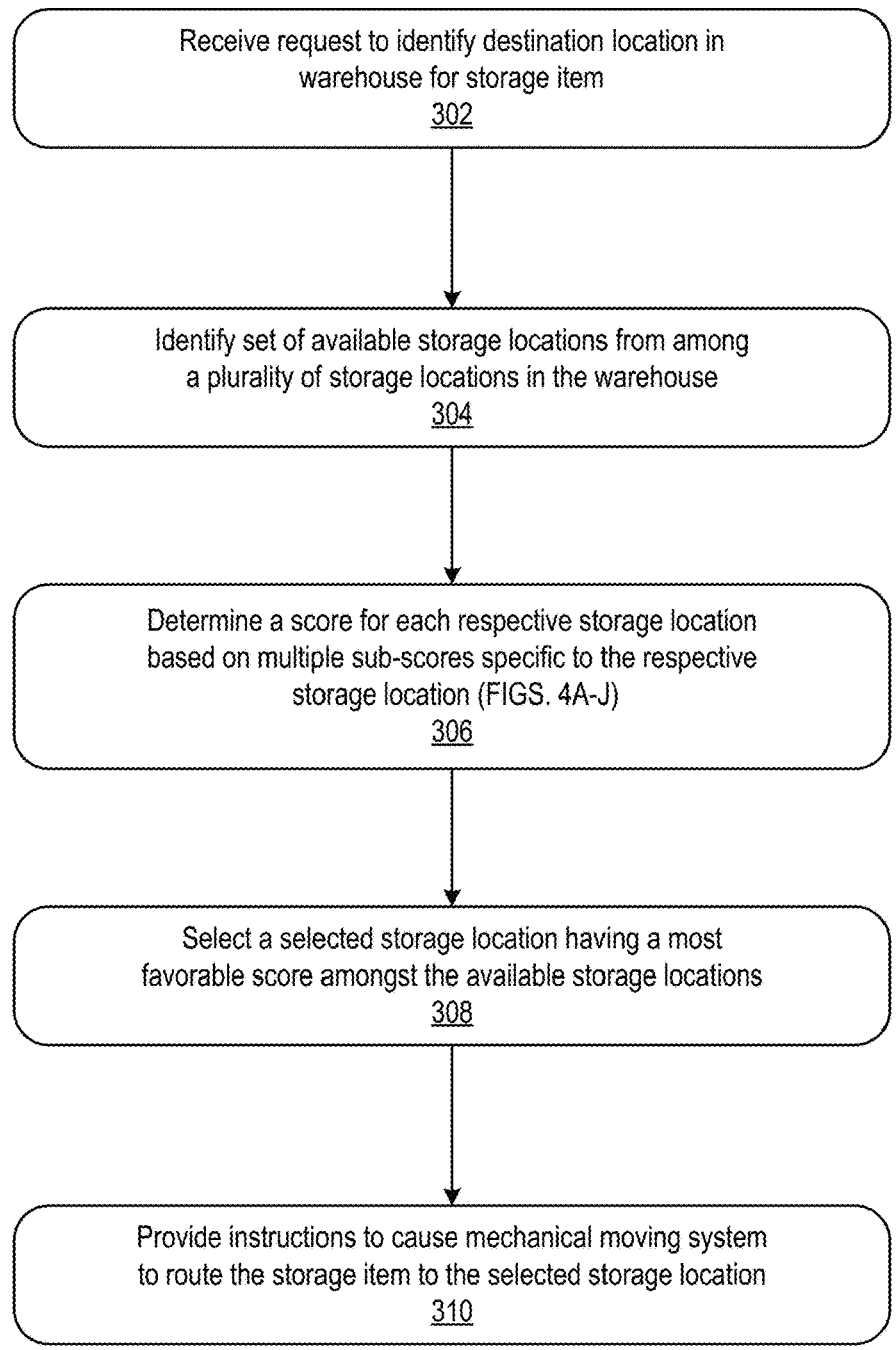
FIG. 3 is a flowchart of a process for selecting the storage location for the physical item.

FIG. 3 is a flowchart of a process 300 for selecting the storage location for the physical item. The process 300 can be performed by one or more computer systems, such as the computer system 102 described herein. The process 300 can be performed once an item enters a storage facility or is inbound. The process 300 can also be performed while the item is being routed through the storage facility.

Referring to the process 300, a request to identify a destination location in a warehouse for a storage item can be received (302). In other words, once the storage item enters the warehouse, it can be scanned. Scanning the item can trigger the system to generate a request to identify a destination location for the storage item. A forklift driver can use a hand scanner or some other scanning device to scan information about the item. In other implementations, one or more cameras can be used to capture information about the item. The information can be added to a warehouse management system (WMS) and used by the computer system 102 in determining an optimal storage location for the item. The information scanned about the item can include, but are not limited to, height, weight, shape, size, a current location of scanning the item, and/or customer identification information.

One or more other inputs or information can be included in the request. These inputs can include but are not limited to a facility code, location name of the item, location coordinates of the item (e.g., x. y, z, or coded region of a warehouse), platform type of a pallet of the item, product master information (e.g., owner identifier, item identifier, identifier date, set of putaway rooms, set of putaway modules, case quantity, case height, gross case height, temperature zone, and/or weight).

The request to identify a destination location for the storage item can also include requirements for the item's storage, as described herein. These requirements can include, for example, a temperature requirement (e.g., the item must be stored in freezing temperatures to preserve the goods therein) and/or a height/width/size requirement. Such storage requirements can be determined using one or more techniques. For example, the storage item can be physically moved through a scanning system that is configured to scan one or more sides of the storage item to identify information about the item before the item is moved throughout the warehouse. As another example, the storage item can be physically moved (e.g., manually by a human worker, automatically by a warehouse vehicle and/or a mechanical conveyor belt system, etc.) to a scale to determine a weight requirement for the storage item. The storage item can also be electronically scanned (e.g., by an automatic scanning system, by a human worker, etc.) to calculate size requirements for the storage item. As yet another example, a temperature of the storage item can be captured by temperature sensors that are part of the scanning system or a device used by a human worker to determine a temperature requirement for the storage item.

A set of available storage locations can be identified from among a plurality of storage locations in the warehouse (304). Storage locations that are not available (e.g., they are reserved for certain items or customers, they are reserved for temporary storage, they are at 100% fill capacity, etc.) may not be included in the set of available storage locations. A storage location may not be available, for example, if the storage location does not satisfy the temperature requirement and/or size requirement (e.g., height, width) of the storage item. One or more other requirements can be analyzed as a baseline to determine which storage locations are available.

Information about all storage locations in the warehouse can be received from the WMS and analyzed to determine which storage locations may be available for storing the storage item. The information received from the WMS can include, for each storage location, location name, room, aisle, bay, level, coordinates (x, y, z), picking rate, picking rate percentile, temperature zone, maximum height, maximum weight, capacity (e.g., maximum number of storage items), location type (e.g., first-in-first-out or last-in-first-out), and/or set of items currently stored in the location. Information about items currently stored or moving through the warehouse can also be received. This information can include, for each item in the warehouse, location name, depth in the location, owner code/identifier, item code/identifier, code/identifier date, current location, target location (e.g., room, aisle, lift mechanism, storage location) and/or how the item is being moved in the warehouse (e.g., by conveyor belts, other components of a mechanical moving system, forklifts, human workers, autonomous vehicles, and/or lifts/elevators).

In some implementations, a location can be available based on whether it is empty (in other words, the location is not currently storing any items) or the location is partially full. Some warehouses may prefer to fill all partial locations before filling empty locations. In such situations, the partial locations can be identified as available storage locations and the empty locations can be identified as unavailable. In other implementations, storage locations on certain levels of the warehouse can be deemed available. For example, if top storage levels should be filled in a warehouse before lower levels, storage locations in the top levels can be identified as available and storage locations in the lower levels can be identified as unavailable, even if the lower level storage locations have space or capacity for the storage item.

A score for each respective storage location can be determined based on multiple sub-scores specific to the respective storage location (306). The score can be a cost determination based on a current state of the warehouse or other storage facility. In some implementations, and as described herein, a more favorable score can be a lower value score (e.g., closer to 1 or closer to a lower value on a designated favorability scale) and a less favorable score can be a higher value score (e.g., closer to 5 on a 1-5 scale or closer to a higher value on a designated favorability scale). As described in reference to FIGS. 2A-G and FIGS. 4A-J, one or more of the sub-scores comprising the favorability score for each respective storage location can include size, weight, travel time, type, picking rate, fill capacity, quantity moving, real-time traffic, and/or compatibility. The sub-score can be combined to determine an aggregate favorability score for each storage location. One or more sub-scores can be used based on different characteristics of the warehouse or storage facility. For example, some facilities may only weigh or consider some but not all of the sub-scores in determining an aggregate favorability score for each storage location. Other facilities may weigh or consider all of the sub-scores and additional sub-scores in determining the aggregate favorability score for each storage location. The sub-scores can also be weighed based on importance within the warehouse. For example, an automated warehouse may place more emphasis on the quantity moving sub-score than other sub-scores. Therefore, the quantity moving sub-score can be a more important factor in determining an aggregate favorability score per storage location.

In some implementations, the cost function in 306 can determine which module an item can go to, under an assumption that a number of partial locations for the item under consideration is satisfied. For each module a cost (favorability score) can be determined, as described herein. Variables in the cost function can include an indicator of whether a number of partial locations in a module is greater than 0, a distance from a current location/position of the item to an inbound elevator of the module, and a number of pallets heading to the module.

In other implementations, in case a current number of partial locations of the item is not equal to a set number of partial locations for the item, then an additional partial location may need to be created. Consequently, the cost function in 306 can include determining a module since a new location for the item should be assigned. The cost function can be calculated for each combination of module and location type. Therefore, a decision to go to a certain module can be made based at least in part on preferred available location types within each module. One or more parameters can be used in this cost function such as a number of partial locations in the module, a distance from a current location of the item to an inbound elevator of the module, a number of items heading to the module, a number of items of the same type already stored in the module, a filling percentage of the module, numeric values for the location type (e.g., LIFO small can be indicated by a 0, FIFO small can be indicated by a 1, FIFO by a 2, FIFO large by a 3, LIFO by a 4, and LIFO large by a 5), and a numeric value of the item preference of the location type.

Still referring to the process 300 in FIG. 3, a storage location can then be selected for having a most favorable score amongst the available storage locations (308). As described throughout this disclosure, the storage location of the available storage locations having a most favorable aggregate score can be chosen for the storage item. Moreover, as described herein, once the storage location is selected, another of the available storage locations can be selected as the most favorable for the storage item based on real-time conditions in the warehouse. The most favorable aggregate score can indicate a lowest cost for storing the item in the respective storage location.

Instructions can be provided to cause a mechanical moving system to route the storage item to the selected storage location (310). In some implementations, instructions can be provided to a warehouse worker (e.g., forklift operator). The warehouse worker can move the storage item to the selected storage location. The warehouse worker can also configure components of the mechanical moving system to move the storage item to the selected storage location. In other implementations, the storage item can be automatically moved to the selected storage location using one or more autonomous vehicles or other components of the mechanical moving system (e.g., conveyor belts, inbound conveyor, a loop, lifts/elevators, aisle carts, and/or cranes). The instructions can include information such as a facility code, location name to put away the item, and location coordinates for the selected storage location (x, y, z).

The process 300 can be performed for each inbound item. The process 300 can also be performed multiple times for each item. For example, the process 300 can be performed once the item is scanned to determine a most favorable level in the warehouse to store the item. The item can be routed to the most favorable level. Once at that level or on route to the level, the process 300 can be performed another time to determine a most favorable storage location (e.g., room, aisle, rack, etc.) on that level. As yet another example, once the item is moved to the most favorable storage location, the process 300 can be performed again to determine a most favorable spot to store the item within the most favorable storage location. Performing the process 300 multiple times per inbound item can be advantageous to optimize on warehouse efficiency, optimize on storage space, and make modifications to routing or storage based on real-time conditions within the facility (e.g., traffic, bottlenecks, large outbound volume, large inbound volume, etc.).

In some implementations, the process 300 can be performed once an inbound item reaches or arrives at a particular module (e.g., level) in the storage facility. How the process 300 is performed can depend on whether a new location or a partially filled location should be assigned to the item. Selecting a new location or partially filled location can be based on whether a number of partial locations in the module is less than a number of partial locations for the item divided by a number of modules in the storage facility. This equation can assume that uniform distribution of partial locations over all the modules in the facility is desired. If this equation is found as true, then the process 300 can be performed to calculate a cost for all empty locations in a module. After all, this can indicate that items can be stored in new locations and thus a new partial location can be created. If this equation is found as false, then the process 300 can be performed to weight different partial locations in a single module (assuming there is more than one partial location to choose from). Regardless of whether the equation returns true or false, the process 300 can be performed twice at an inbound process of an item. The first time can be to determine a level (e.g., module) for storing the item and the second time can be to determine a particular storage location within the selected level. Although the first time can return a location for storage, a level of the returned location can be extracted so that the item can be sent to a correct aisle cart. Once arrived at the same level and the item is on the correct aisle cart, the process 300 can be performed again. If nothing changed in the time interval between the two calls to the process 300, then the cost function can return the same location in which the pallet should be put away. The two calls to the process 300 can be made to ensure that in case conditions change, the storage location can be updated according to newly obtained information.

Referring to the equation mentioned above, where the equation is found to be true, the process 300 can be performed to calculate a cost for all empty locations in a module (e.g., level). This process 300 can take into account average picking rates and amounts of time that items are to be stored in the storage facility. This process 300 can also be aimed at spreading items over different levels in a same module while taking into account filling up an entire module to improve space efficiency. The cost function in 306 can therefore take into account one or more of the following parameters: a numeric value of the location type, a numeric value of an item preference of the location type, a picking rate quantile of the location, a picking rate quantile of the item, a number of items in storage in the module level of the location, a number of items heading to the module level of the location, a filling percentage of the module level of the location, and an indicator of whether a number of partial locations on the module level exceeds 0.

Where the equation is found to be false, the process 300 can be performed to weight the different partial locations in a single module (e.g., level). Generally, the set of partial locations can be small, and in situations where there is only one partial location, that location can be selected without performing the process 300. The process 300 can be set up such that partial LIFO locations can have a lower cost than partial FIFO locations, especially if it is desired to completely fill a LIFO location. One or more of the following parameters can be used in determining the cost function in 306: a filling percent of the location, a distance from a current location of the item to the location, and a number of items heading to the module level of the location.

FIGS. 4A-J is a flowchart of a process 400 for determining a favorability score for the storage location. The process 400 can be performed by the computer system 102 and/or any one or more other computer systems. Any one or more steps of the process 400 can be performed to determine a favorability score for a respective storage location. The process 400 can be performed as part of 306 in process 300, as described in reference to FIG. 3.

Referring to the FIGS. 4A-J and the process 400, a sizing sub-score can be determined for a respective storage location in 402. A size of the storage item can be identified (404). A size of the respective storage location can be identified (406). An amount that the size of the respective storage location is greater than the size of the storage item can be determined (408). A sizing sub-score can be assigned to the respective storage location based on an amount that the size of the respective storage location is greater than the size of the storage item (410). In some implementations, the size of the storage item can fall within a range from a minimum size of the respective storage location to a maximum size of the respective storage location.

Alternatively or additionally, a more favorable sizing sub-score can be assigned when the size of the respective storage location is equal to the size of the storage item rather than when the size of the storage location is greater than the size of the storage item (412). In other words, if the respective storage location has a size that matches the size of the storage item, then the storage location can be an ideal fit for the item since space in the warehouse can be optimized.

An available height of the respective storage location can be compared to the height of the storage item. Additionally or alternatively, dimensions or size of the storage item can be compared with available dimensions or size in the respective storage location. Each of the respective storage locations can have differently sized available spaces and the farther away in size that an available space is from the storage item's size, the less favorable score will be assigned to that storage location. In some implementations, storage locations having available space most similar in size to the storage item can be compared relative to each other to find the best fit and assign the most favorable sizing sub-score. For example, the computer system 102 can look at the largest available sizes in storage locations and assign those with less favorable scores, then work down until an optimal sized storage location is identified. That storage location can be assigned the most favorable sizing sub-score.

In some implementations, a more favorable sub-score can be assigned to a storage location that has available height to store more than one pallet stacked thereon. This type of location can receive a more favorable sub-score because stacking items there can optimize on space in the facility and specifically within that location (e.g., more items can be stacked on top of each other). Likewise, if the location does not have available height to store multiple items, the location can receive a less favorable score since storing the storage item in that location may not result in optimizing on space (e.g., storing and stacking as many items as possible in the location). In other implementations, a location having the available space to store items stacked on top of each other can be assigned a less favorable score than a location having available height to store one item because the storage item can be of a height that would fill most of the available space but leave space that may not be easily filled by other items. Therefore, space may not be optimized in that respective storage location.

The sizing sub-score can be based on available height of the respective storage location. In some implementations, the sizing sub-score can be weighted more than other sub-scores. This is because fitting items into available spaces that are closest in size to the item can be advantageous to optimize on space and warehouse efficiency. It can be inefficient to store a storage item in a location that has a height that is significantly larger than a height of the storage item. In other implementations, to optimize on space in the warehouse, a more favorable sizing sub-score can be assigned in a location that has enough space to store many small items. This can be advantageous in a warehouse that receives mostly small items rather than large ones. This can also be advantageous when all inbound large items have already been stored in the warehouse or are currently being moved to locations in the warehouse and any remaining inbound items are smaller in size.

In some implementations, the sizing sub-score can be assigned based on wanting to store fewer large items in one storage location having a lot of available space since these larger items may not fit into other storage locations. In other implementations, the sizing sub-score can be assigned based on identifying storage locations that already have large items stored therein such that any gaps or open spaces in those storage locations can be filled with smaller items. Doing so can optimize on storage space in the overall warehouse. For example, a storage location storing mostly large items can receive a more favorable score than an empty storage location where the storage item is small and therefore can fit into available space in the storage location having mostly large items. This assignment of the sizing sub-score can be advantageous where leftover available space in the respective storage location cannot be used for storing other items of similar size as those items currently stored therein or any other items that may not match the available size of space in that respective storage location. In yet other implementations, the sizing sub-score can be assigned based on wanting to fill locations that already have small items stored therein by filling in the gaps or available space with larger items. This can be advantageous where large inbound items are received at the warehouse for storage and smaller items can be more easily moved around the respective storage location to fill in gaps or available spaces within that respective storage location or other storage locations throughout the warehouse.

As described herein, a storage location that has available space that is too small or too large in comparison to the size of the storage item can receive a lower favorability score. The lower favorability score can be a higher score value. A storage location closer in size to the storage item size can receive a more favorable score. The more favorable score can be a lower score value. Thus, a lower score value can be indicative of a lower cost for moving and storing the storage item at the respective storage location having the most favorable sizing sub-score.

Still referring to FIGS. 4A-J, a weight sub-score can be determined in 414. A weight of the storage item can be identified (416). A maximum weight capacity of the respective storage location can be identified (418). An aggregate weight of items currently stored at the location can be identified (420). A remaining weight capacity of the respective storage location can be determined based on a difference between the maximum weight capacity of the respective storage location and the aggregate weight of the items currently stored at the location (422). Next, an amount that the remaining weight capacity exceeds the weight of the storage item can be determined (426). In some implementations, assigning the weight sub-score can be based on items currently stored at the respective storage location having at least one of (i) a same type, or (ii) a same weight as the storage item. The weight sub-score can also be based on a maximum weight capacity when nothing is currently stored in the respective storage location. If the location has a weight capacity that exceeds a predetermined threshold value, then storing lighter weight items there may optimize on weight capacity of the warehouse. Therefore, the location can receive a more favorable weight sub-score, assuming the storage item is lightweight. If the item is heavy weight and similar or same items as the storage item are currently stored in the location, the location can receive a less favorable score because the location may not be able to sustain that much weight.

Moreover, if a location is built to accommodate heavyweight items, then the location can be assigned a less favorable score for a lightweight storage item, even if similar weighted items or similar or same type items are currently stored in the location. The location can be assigned a more favorable score for a heavier weight storage item, especially if the location is currently storing or can store more than one of the same type as the heavier storage item.

In other implementations, it may not be desired to overload one location with too much weight or to fill it to its weight capacity immediately. Therefore, if the storage item is lightweight, the location can be assigned a favorable score. If the storage item is heavy relative to the amount of available weight in the location, the location can be assigned a less favorable score since storing the item in that location may overload the location or cause the location to fill to its weight capacity more immediately.

In yet other implementations, a maximum weight and/or a remaining available weight capacity of the respective storage location can be compared to the maximum weight and/or remaining available weight capacity of other available storage locations. Doing so can be advantageous to assign a more favorable score to the location having an available weight capacity that is closest to the weight of the storage item. In other words, like the sizing sub-score, to optimize on weight distribution in the facility, a more favorable weight sub-score can be assigned to a location having an available weight capacity closest to that of the actual weight of the storage item.

In other implementations, the weight of the storage item can be compared to weights of items currently stored in the respective storage location to determine whether the storage item can be stored in the same storage location. For example, items can be grouped together in available storage locations based on the items having similar weights, similar types, and/or being stored in the same location. A more favorable score can be assigned to a location that (i) can store an amount of weight exceeding a threshold value and (ii) currently stores items of the same weight and/or type. Doing so can be advantageous to optimize on a number of items stored in the location, to optimize on weight capacity in the location, and to provide for easier and/or faster picking of like items in bulk. Thus, in some implementations, a less favorable score can be assigned to a location having items of different weights and/or types.

Additionally or alternatively, a more favorable weight sub-score can be assigned when the weight of the storage item is less than a predetermined threshold amount of weight of the remaining weight capacity of the location than when the weight of the storage item is greater than or equal to the predetermined threshold amount of weight (428). In other words, the respective storage location can store the storage item and still have capacity to store additional items. This can be advantageous for storing lighter weight items that may be smaller in size and/or more challenging to find optimal fits in available storage locations.

Still referring to FIGS. 4A-J, a travel time sub-score can be determined in 430. A first projected travel time can be determined between a current location of the storage item and the respective storage location (432). A second projected travel time can be determined between the current location of the storage item and a second respective storage location (434). A more favorable travel time sub-score can be assigned when the first projected travel time is less than the second projected travel time than when the first projected travel time is greater than the second projected travel time (436).

The travel time sub-score can be based on an amount of time needed to move the storage item to the respective storage location. The travel time sub-score can be based additionally or alternatively on an actual distance (e.g., using GPS coordinates) between the current location of the storage item and the respective storage location. For example, the actual distance can be a rough estimate and can be used as a weighting factor for determining a more favorable or less favorable travel time sub-score. GPS and/or location sensors throughout the warehouse, on the storage item, and/or on a forklift or other vehicle that is moving the storage item can be used to identify one or more coordinates of the storage item relative to one or more locations in the warehouse. Triangulation techniques can then be used to determine the actual distance between the storage item and the respective storage location.

In other implementations, the actual distance may not be used in determining the travel time sub-score. For example, a storage location that is farther away in distance from the current location of the storage item can be assigned a more favorable score than closer storage locations because of one or more factors: (1) less traffic can currently exist or be projected along a route to the farther away location, (2) the route to the farther away location can be less frequented, (3) the farther away location can have fewer items currently stored there, which can mean that the location may have less traffic in the future (e.g., at a time that the storage item may have to be picked from the location), (4) getting to the farther away location may not require wait times at elevators, lift mechanisms, cranes, (5) wait times to get to the farther away location can be less than wait times to get to other closer locations, and/or (6) a combined projected time to get to the farther away location can be less than a combined projected time for getting to a closer location.

Alternatively or additionally, the travel time sub-score can be assigned based on one or more factors including but not limited to (i) wait time for storage items in a queue, (ii) wait time for storage items at lift mechanisms, (iii) travel time for storage items in lift mechanisms, (iv) travel time for storage items through mechanical moving systems, (v) an amount of traffic of storage items in the warehouse, (vi) an amount of time needed to pick the storage item after storage and deliver the storage item to a docking area, (vii) an amount of time needed to move the storage item from the respective storage location to a second destination in the warehouse, (viii) a quantity of items being currently stored at the respective storage location, (ix) an actual distance between the current location of the storage item and the respective storage location, and/or (x) an actual distance between the current location of the storage item and the second respective storage location (438).

One or more different units can be combined to determine an overall travel time for the storage item. For example, current and/or projected wait times, travel times through conveyor systems and/or lifts, and/or travel time through one or more different aisles can be combined to determine the overall travel time. The overall travel time can also change dynamically and/or in real-time based on conditions in the warehouse and/or movement of other storage items to available storage locations. In some implementations, a storage location can be assigned a favorable score when that location has a historically faster picking rate and/or travel time after items are stored there in comparison to other available storage locations. For example, a location closer to a warehouse loading dock can be assigned a favorable score since that location has a faster picking rate than other locations in the warehouse. This can be advantageous where the storage item requires faster picking and/or less travel time upon picking/outbound movement from the warehouse. As described herein, historic picking rates and/or travel times can be used to determine the travel time sub-score for the respective storage item.

Still referring to FIGS. 4A-J, a type sub-score can be determined in 440. A type of the storage item can be identified (442). Items having the same type as the storage item that are currently stored in locations in the warehouse can then be identified (444). The same type can be identified based on a perishable date, storage temperature, SKU, customer identifier, product, outbound date, and/or delivery date. One or more additional or other factors can be considered to determine that one or more items within the warehouse are of the same type as the storage item. A quantity of storage items having the same type as the storage item can be determined at the respective storage location (446). The type sub-score can then be assigned based on the quantity of items having the same type at the respective storage location exceeding a threshold value (448). For example, it can be advantageous to store a certain number of items of the same type in one storage location to make for easier and/or faster picking in bulk. It can also be advantageous to group same items together for general organization of the warehouse (e.g., organizing item storage based on customer). The threshold value can be determined based on the quantity of same items currently stored in other locations in the warehouse. In other words, a storage location having the greatest quantity of same items stored therein can be assigned a more favorable score relative to a storage location having a smaller quantity of same items stored therein.

In other implementations, same items can be stored in different storage locations to avoid bottlenecks in the future when picking the same items, especially if the items are to be picked in bulk. In such an example, where the quantity of items currently stored in the respective storage location exceeds a threshold value, the location can be assigned a less favorable score. In yet other implementations, a location having a certain number of the same items currently stored there can be assigned a less favorable score if the location should not store more of the same item. In other words, it can be advantageous to have predefined quantities of the same item per storage location. Once one location reaches the predefined quantity of the same item, that location can receive a less favorable score than a location that does not yet store the predefined quantity of the same item therein.

Still referring to FIGS. 4A-J, a picking rate sub-score can be assigned in 450. Items can be identified that are currently stored in the respective storage location (452). A picking rate can be determined for each of the items currently stored in the respective location (454). A projected picking rate of the storage item can be determined (456). The picking rate sub-score can then be assigned to the respective storage location based on the picking rate for each of the items currently stored at the respective storage location being less than a projected picking rate of the storage item (458). In some implementations, the picking rates for each of the items currently stored at the location can be aggregated and/or averaged and this aggregated or averaged picking rate can be used to determine the picking rate sub-score for the location.

Additionally or alternatively, a more favorable picking rate sub-score can be assigned when the projected picking rate of the storage item is greater than a second projected picking rate of a second storage item that is being routed to the respective storage location than when the projected picking rate of the storage item is less than or equal to the second projected picking rate of the second storage item (460). In other words, if the picking rate is less than or equal to the second projected picking rate of the second storage item, then traffic can result when moving the storage item and the second storage item to the location and/or when the storage item and the second storage item need to be picked.

The picking rate sub-score can be determined based on whether storing the storage item in the respective location may violate a first-in-first-out order (FIFO) and/or a first-in-last-our order (FILO). For example, if the storage item is projected to be picked sooner than items currently stored in the location, then the location can be assigned a more favorable score than a location where the storage item may be picked at a same time or at a later time than the items currently stored there.

A projected picking rate of the storage items and picking rates of currently stored items can be determined using historic picking rates and/or picking frequencies, which can be based on information stored in a warehouse management system (WMS) and/or data store. For example, a picking rate can be determined based on how much of an item is put on a truck or sent for outbound shipment on a daily, weekly, or other predetermined basis. An average picking rate score can be determined over a certain amount of time. The average score can then be normalized (e.g., divided by a number of items in the warehouse at a particular time) to determine whether the item can be turned over faster than other items in the warehouse. If the item can be turned over faster, it can have a higher picking rate (e.g., velocity), and therefore a location closer to the outbound area that also has items with a lower picking rate can be assigned a more favorable score than a location that is farther away from the outbound area and/or having items having a higher picking rate relative to the projected picking rate of the storage item. In other implementations, a less favorable score can be assigned to a closer location if there are bottlenecks or traffic proximate to that closer location. Thus, it may not be desirable to put a same item having a same picking rate in one location since that can cause delays at a time of picking the item. Additionally, it may not be desirable to put different items having a same or similar picking rate in the same location because that can cause delays or bottlenecks in picking the items. A location storing items with the same picking rate as the storage item can be assigned a less favorable score than a location storing items having different picking rates than the storage item.

If the storage item is less likely to be picked before other items currently stored in the respective storage location, then a less favorable score can be assigned to that location. In other words, it may not be advantageous or efficient to store the storage item in a location that can block, prevent, or slow down picking of items currently stored at the location. A more favorable score can be assigned to a location where the storage item is projected to be picked before items that are currently stored at the location. Therefore, it can be acceptable to store the storage item in front of or blocking the items currently stored in the location (e.g., in a FIFO order location).

In some implementations, a storage location closer to a front of the warehouse or an outbound docking area can be assigned a favorable picking rate sub-score for a storage item that is quickly moving in and out of the warehouse relative to items currently stored in that location. This can be advantageous to increase overall warehouse efficiency and to minimize potential latencies since an amount of time needed to move the storage item after picking can be reduced. If the storage item turns over slower (e.g., has a lower picking rate), an available storage location that is farther away from the outbound area of the warehouse can be assigned a more favorable score. In some implementations, even if the storage item has a higher picking rate than other items currently stored at a respective location closer to the outbound area of the warehouse, the location can be assigned a less favorable score because at a time of picking, the closer location can experience more bottlenecks, congestion, and/or traffic.

In yet other implementations, the picking rate sub-score for a location can be adjusted relative to other locations based on their proximity to an outbound area of the warehouse. A location that has a higher turnaround of items (e.g., higher picking rate on average for items stored therein), can receive a more favorable score. In other implementations, however, if the location has high turnaround, the location may also experience bottlenecks and/or traffic. Therefore, the location can be assigned a less favorable picking rate score. Where the location has high turnaround and the storage item has a low picking rate, the location can be assigned a more favorable score since the storage item can be stored at the location while other items of higher picking rates can be moved out of that location faster (e.g., in a FILO order). Likewise, if the location has low turnaround and the storage item has a high picking rate, the location can be assigned a less favorable picking rate score.

Still referring to the FIGS. 4A-J, a fill capacity sub-score can be determined in 462. A quantity of items currently stored at the respective storage location can be determined (464). A percent of fill capacity for the respective storage location can be determined (466). The fill capacity sub-score can be assigned based on the percent of fill capacity being less than a threshold value (468). In some implementations, the threshold value can be 100%, or full capacity. In other implementations, the threshold value can be less than full. It can be desirable to fill a location to 100% capacity before filling one or more other locations in the warehouse. Filling a location to full capacity can be advantageous for items of a same type, items having low picking rates (e.g., items that will be stored for a while), and/or items having the same picking rate or storage time.

If the filled capacity of the respective storage location is less than 100%, a more favorable score can be assigned to the location. As described herein, even if the fill capacity is not yet at 100%, additional factors, such as a weight and/or size of the remaining available space in the location can be considered. For example, if the filled capacity is less than 100%, then it can be determined whether same type items are stored in the location and/or whether the remaining available space in the location can fit the storage item. It can also be determined whether a maximum remaining weight capacity of the location is greater than or equal to the weight of the storage item. Even more so, it can be determined whether the storage item has a higher picking rate than items currently stored in the location, because even if storing the item at the location can cause the location to reach full capacity, storing the item in front of currently stored items can cause bottlenecks and/or delays when picking those currently stored items. A more favorable fill capacity sub-score can be assigned accordingly.

In some implementations, the fill capacity sub-score can be advantageous for scoring drive-in racks in the warehouse, where items are loaded and retrieved from a same side. Therefore, it can be important not to block items currently stored at the location that may need to be picked before the storage item, even if the fill capacity is not at 100% for the location.

In some implementations, the fill capacity threshold value can be a predetermined percent or quantity of items that is less than 100% full capacity. It can be preferred to keep one or more locations filled to an amount less than 100% such that randomly sized items, similar or same items, and/or items that are being temporarily stored in the warehouse can fill in these gaps. For example, a location maintained at less than 100% full capacity can be used as a temporary storage location, such as when there is traffic in the warehouse and a storage item needs to be temporarily stored until the traffic lightens up before being moved to the storage item's desired destination storage location.

Maintaining storage locations at a fill capacity less than 100% can also be advantageous to limit how many items are stored in that location so that the location can be emptied. It can be desired to clear out a location such that the location can be used for storing one type of items, used as a temporary storage location, and/or any other conditions. For example, it can be determined what type of items are stored in the respective location. a quantity of items based on type can then be determined for that location. If the quantity of any one item type exceeds a predetermined threshold value, then a less favorable score can be assigned to that location. In other implementations, however, if the quantity of one item type exceeds the threshold value and the storage item is of the same type as that quantity, then a more favorable score can be assigned to that location. This can be beneficial to group together items of the same type in one location and to max out a number of items of the same type within one location. This can be advantageous when picking items of the same type in bulk.

Still referring to FIGS. 4A-J, a quantity moving sub-score can be assigned in 470. Information about items currently being moved in the warehouse can be received (472). This information can be received from cameras and/or other sensors positioned in the warehouse and/or on forklifts or other autonomous vehicles (e.g., GPS or location sensors) moving throughout the warehouse. Real-time information can be received from sensors about movement in aisles and/or movement towards an aisle or storage location. Information can also be received from a warehouse management system (WMS). Example information from the WMS can include routes that items and/or warehouse vehicles are taking throughout the warehouse and projected traffic or movement times through each of the aisles or rooms/storage locations of the warehouse.

A quantity of items currently being moved in an aisle, the respective storage location, or the available storage locations can be determined (474). In some implementations, a quantity of items in the aisle can be determined. In other implementations, a quantity of forklifts or other warehouse vehicles in the aisle can be determined. In yet other implementations, an amount of time that it takes items or warehouse vehicles to move a certain predetermined distance can be determined and used in assigning the quantity moving sub-score.

The quantity moving sub-score can be assigned based on the quantity of items being less than a threshold value (476). The threshold value can be a number of items allowed in an aisle at a given time that would avoid congestion within that aisle. The number of items can also be based on a size, weight, and/or type of the item. In some implementations, a quantity of items heading to the aisle can also be received and used to predict whether there will be traffic in that aisle.

The quantity moving sub-score can be an indication of traffic to the respective storage location, a room, and/or an aisle. A location whose route requires passing through an aisle that is experiencing traffic, bottlenecks, or congestion can be assigned a less favorable score than a location whose route includes passing through an aisle that is not experiencing traffic, bottlenecks, or congestion. The quantity moving sub-score can be determined for each possible aisle that can be taken to reach a respective storage location. The respective storage location can then be assigned the most favorable score amongst scores for the possible aisles.

Alternatively or additionally, the quantity moving sub-score can be based on one or more factors including but not limited to (i) a number of items permitted in the aisle, respective storage location, or available storage locations at a given time, (ii) sizes of the items currently being moved, (iii) weights of the items currently being moved, (iv) types of the items currently being moved, and/or (v) projected traffic time (478).

Real-time traffic conditions can be received for the quantity of items currently being moved (480). The quantity moving sub-score can be adjusted based on the real-time traffic conditions (482). A first projected amount of time that the storage item would be stored in the respective storage location can be determined (484). Based on the real-time traffic conditions, a second projected amount of time to move the storage item to the respective storage location can be determined (486). A more favorable quantity moving sub-score can be assigned when the first projected amount of time exceeds the second projected amount of time than when the first projected time is less than or equal to the second projected amount of time (488).

As an example, forklifts can form a queue up if they are waiting at a same location. To improve efficiency in the warehouse, avoiding the queue can be advantageous, so a less favorable quantity moving sub-score can be assigned for a storage location that is accessible via the route having the queue. Even if the storage location is empty or has sufficient capacity, it may not be the most desired storage location since it can take too long to move the item to that location in comparison to other storage locations having less real-time traffic. Therefore, a quantity of items or forklifts heading to the same storage location or currently waiting to go to that storage location can be determined. If the quantity of items exceeds a predetermined threshold amount, a less favorable score can be assigned to the associated respective storage location. The threshold amount can be a maximum quantity of items permitted in a queue before the queue is considered to be congested or having too long of a wait time. The threshold amount can be determined, for example, based on historic analysis and/or predicting how long it would take to move all the items currently in the queue into the storage location).

One of the goals of the warehouse can be to spread items out to avoid congestion at a time of storing while also ensuring an optimal time for picking stored items, especially if items stored in a particular location have the same/similar picking date/time. In some implementations, however, if a respective storage location is the optimal storage location for the type of item (e.g., the storage location is the only frozen storage area and the item requires cold storage), then a more favorable score can be assigned to the location even if there is current or projected traffic to move the item to that location.

In some implementations, real-time traffic conditions can be continuously received to check whether congestion ended or is less than at an earlier time. Based on these real-time changes in traffic, the quantity moving sub-scores can be adjusted for each of the respective storage locations. Therefore, some respective storage locations can become more desirable locations for a particular item. If that is the case, then the item can be rerouted to the more desirable location, even if the item is already on route to a different storage location.

As described throughout this disclosure, one or more other factors can influence the quantity moving sub-score. For example, it can be determined how long an item will be stored in a particular storage location and how long it would take to get the item into storage in that location. Such determinations can be made using predictive analytics, historic analysis and/or trends, and analysis of similar or same types of items and/or traffic or warehouse conditions. If, for example, the item would be stored in the location for a short period of time and that period of time exceeds how long it would take to get the item to the location, then a less favorable score can be assigned to that location. After all, it may not be worth the wait to store the item at that location when it can be stored elsewhere much faster. If the item would be stored in the location for a longer period of time that exceeds how long it would take to get the item to the location, then a more favorable score can be assigned to that location. After all, it may be worth the wait because the item will be stored in the location for a long time. Storing an item in one location for a longer period of time can be advantageous to reduce possible congestion at a time when items need to be picked throughout the warehouse. It can be more advantageous to have queues or longer wait times during stowing of items rather than during picking of items.

Still referring to FIGS. 4A-J, a compatibility sub-score can be determined in 490. A first set of characteristics about the storage item can be identified in 492. The first set of characteristics can include but are not limited to a type of the storage item, a customer identifier, size of the storage item, weight of the storage item, and/or an amount of time for keeping the storage item in storage. A second set of characteristics can then be identified about the respective storage location in 494. The second set of characteristics can include but are not limited to whether the respective storage location is single deep, double deep, a drive-through rack, a drive-in rack, automated, and/or manual. The compatibility sub-score can be assigned based on one or more of the first set of characteristics being compatible with one or more of the second set of characteristics in 496.

Alternatively or additionally, the compatibility sub-score can be based on one or more factors including but not limited to (i) a quantity of forklifts moving items in the warehouse exceeding a first threshold value, (ii) a quantity of the available storage locations exceeding a second threshold value, (iii) a quantity of lift mechanisms exceeding a third threshold value, (iv) a quantity of manual workers exceeding a fourth threshold value, and/or (v) the warehouse being automated (498). The threshold values described herein can dynamically change based on specifics about the warehouse, such as changes made to the warehouse's layout, structure, number of working employees, number of working mechanical conveyor systems, number of working forklifts or other autonomous vehicles, transition to an automated warehouse, transition to a manual warehouse, etc.

The compatibility sub-score can be situation or warehouse specific. In some warehouse settings, it can be desired to spread out like items rather than grouping them together in order to reduce bottlenecks where mass retrieval of like items is required. In other warehouse settings, it can be desired to keep like items together so that they are easier and/or faster to retrieve/pick in bulk. Moreover, the latter can be preferred where mass retrieval is historically not a trend in the warehouse setting. Thus, the compatibility sub-score can be assigned based on whether requirements of the storage item are compatible or aligned with specifications of a respective storage location.

As mentioned above, the compatibility sub-score can be assigned based on a type of storage location. Thus, in assigning the sub-score, one or more conditions associated with the storage location can be considered. For example, the type of item being put away (e.g., high priority item, higher priority customer) can be considered in relation to whether a respective storage location is mobile, closer to a docking area, single deep (wherein storing the item there would block other items that may or may not be picked before the storage item), double deep, a drive-in rack (wherein storing the item there may not be advantageous if it would block items that are currently stored there and will be picked first), and a drive-through rack (wherein items having a lesser likelihood of being picked first can be stored there since items that will be picked first can already be stored closer to a portion of the rack that is used for retrieval).

In some implementations, a more favorable compatibility sub-score can be assigned when a number of forklifts moving items around the warehouse exceeds a threshold amount. Although the more movement can result in more traffic, a more favorable score can be assigned because the more forklifts can indicate that there is enough movement in the warehouse for items to be spread out and stored in/moved to different locations. Doing so can lead to avoiding future congestion in one or more particular storage locations.

As another example, in some implementations, a more favorable score can be assigned if the warehouse is automated. Automation can mean that items can be moved around the warehouse more efficiently. Thus, storage items can be moved to different locations and/or spread out throughout the warehouse. If, on the other hand, the warehouse is manual, a less favorable score can be assigned. A manual warehouse may be less efficient in storing items. In other words, items may not be moved to storage locations as quickly as in an automated warehouse, so it can be more desirable to consolidate the items into fewer locations. This can result in improved efficiency and reduced congestion in stowing and also retrieving items, especially if items having different picking rates are stored together.

As another example, in some implementations, a number of storage locations in the warehouse can be identified. If the number of locations exceeds a threshold amount, then a more favorable score can be assigned. Since there are many storage locations, items can be spread out amongst the different locations, which can be advantageous to improve efficiency and reduce congestion in stowing and also retrieving items. If, on the other hand, the number of locations does not exceed the threshold amount, then a less favorable score can be assigned. This can indicate that the warehouse is smaller and therefore items should be consolidated into fewer locations rather than spread out in order to avoid traffic or delays in picking.

The sub-scores described in reference to FIGS. 4A-J can be weighted to reach a lowest cost or most favorable overall score for a respective storage location. In some implementations, weights can be initially simulated. Machine learning and/or deep learning techniques and algorithms can be used to improve and generate a weighting scale for the sub-scores. Training can be performed on years of historic trends and data. Training can be continuously performed to determine updated weights specific to particular seasons, customers, types of items stored in the warehouse, etc. Some sub-scores can be weighted more than others, which can also be based on specifics of a particular warehouse (e.g., an automated warehouse can place more emphasis on some sub-scores versus a manual warehouse, where a quantity moving sub-score can be the most important sub-score). For example, each of the sub-scores can start with default weights and, using machine learning, parameters and weights can be fine-tuned based on specific conditions or layouts of the warehouse that are determined historically and/or in real-time. Moreover, as described, a lower number score value can be an indication that the respective storage location is more favorable than a location having a higher number score value. Weights can be modified to more distinctly identify or differentiate lower number score values from higher number score values. As another example, it may be desired in some warehouse settings to assign a higher number score value as an indication of a more favorable score and a lower number score value as an indication of a less favorable score.

Figure 5:
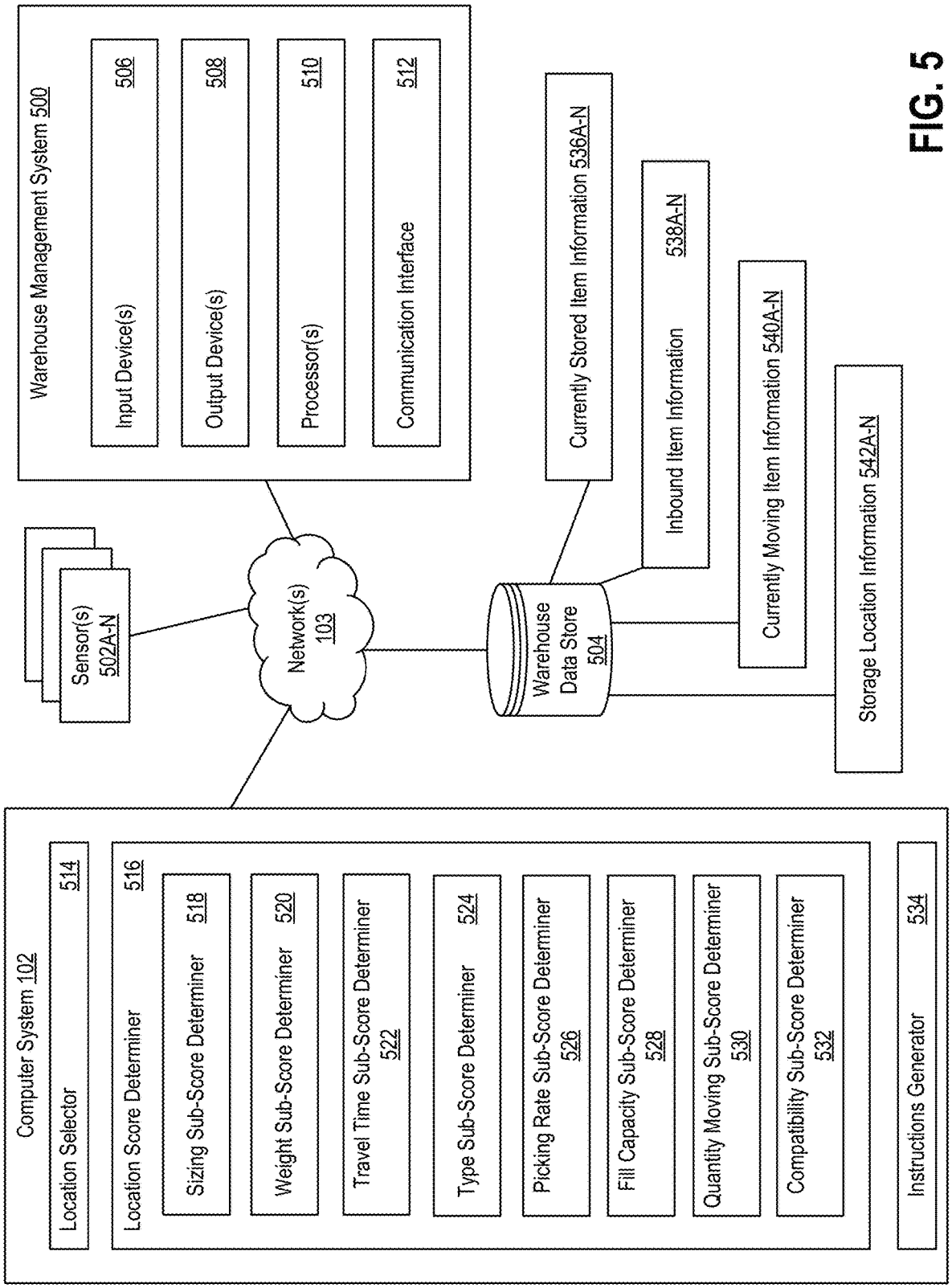
FIG. 5 is a system diagram of components that may be used to implement the technology described herein.

FIG. 5 is a system diagram of components that may be used to implement the technology described herein. The computer system 102, warehouse management system (WMS) 500, sensors 502A-N, and warehouse data store 504 communicate (e.g., wired and/or wireless) over the network(s) 103.

The warehouse data store 504 can store information such as currently stored item information 536A-N, inbound item information 538A-N, currently moving item information 540A-N, and storage location information 542A-N. The information 536A-N, 538A-N, and 540A-N can be profiles for storage items that are dynamically updated. For example, the currently stored item information 536A-N can be updated to include an identifier for a location where the item is currently stored. As another example, the inbound item information 538A-N can be updated as the inbound item is scanned and/or processed at a docking/unloading area. As yet another example, the currently moving item information 540A-N can be updated as the moving item is scanned or processed at different checkpoints along a route in the warehouse. The storage location information 542A-N can also be dynamically updated. For example, the information 542A-N can be updated with identifiers for items that are currently stored therein. The information 536A-N, 538A-N, 540A-N, and 542A-N can be updated, provided by, or inputted by the WMS 500, sensors 502A-N, and/or a user (e.g., warehouse worker) at a computing device (e.g., mobile device, tablet, wearable device, computer, etc.).

Some of the information 536A-N, 538A-N, 540A-N, and 542A-N can include but are not limited to a facility code, location name of the item, item name, location coordinates of the item (in x, y, and z directions), an average/historic picking rate, pallet platform type, product master information, owner code, item code, pallet code, code date, set of putaway rooms (can be empty), set of putaway aisles or modules (can be empty), case quantity, length, height, width, case height, gross weight, temperature zone, location name, location room, location module/aisle, location bay, location level, location coordinates (in x, y, and z directions), location velocity percentile (e.g., average picking rate or movement of items in and out of the location), location temperature zone, location maximum height, location maximum weight, location capacity (e.g., maximum number of items or pallets), location type (e.g., FIFO or LIFO), set of items currently stored in the location (can be empty), depth in the location (for multi-deep locations), and data about team members currently assigned to move items throughout the warehouse. As described throughout, this information can be used by the computer system 102 to determine favorability scores for each available storage location and selecting the most favorable storage location for a storage item.

The WMS 500 can be configured to capture information about items, locations, and users in the warehouse. The information can be received from users in the warehouse, for example, via applications presented to the users at computing devices. The information can also be received automatically from devices and/or sensors (e.g., the sensors 502A-N) throughout the warehouse, including but not limited to GPS or location sensors or cameras (e.g., stereoscopic cameras, LIDAR sensors, etc.) on forklifts or autonomous warehouse vehicles and/or sensors placed throughout the warehouse. The WMS 500 can also be configured to store and access information 536A-N, 538A-N, 540A-N, and 542A-N in the warehouse data store 504. The WMS 500 can also provide information to the computer system 102 that the system 102 can use for determining favorability scores of available storage locations.

The WMS 500 can include input device(s) 506, output device(s) 508, processor(s) 510, and a communication interface 512. The input device(s) 506 can include a touch screen display, keyboard, mouse, audio recorders, or any other devices that can be used to capture information (e.g., from a user like a warehouse worker). The output device(s) 508 can include a touch screen display or other form of display or other device that can be used to provide/present information to a user. The processor(s) 510 can be configured to perform one or more operations when executed. The communication interface 512 can be configured to provide for communication between one or more of the components described herein.

The computer system 102 can include a location selector 514, a location score determiner 516, and an instructions generator 534. The system 102 can include one or more additional or fewer components to perform the techniques described herein. As an illustrative example, an inbound item can be scanned at an unloading zone/docking area of the warehouse. The WMS 500 can capture information 538A-N for the item (e.g., a warehouse worker can scan a barcode on the inbound item, which can identify the item, and/or the item can pass through a scanning system that automatically scans and identifies information about the item), store the information 538A-N in the data store 504, and transmit the information 538A-N to the computer system 102. The computer system 102 can then determine available storage locations (e.g., at the location selector 514), determine favorability scores for each of the available storage locations (e.g., at the location score determiner 516), select a most favorable storage location (e.g., at the location selector 514), and generate instructions for moving the scanned item to the selected storage location (e.g., at the instructions generator 534).

The location selector 514 can be configured to select an available storage location having the most favorable score from a plurality of available storage locations. The location selector 514 can make this determination for each storage item that requires stowage in the warehouse. The location selector 514 can also be configured to determine which storage locations in the warehouse are available for storing a particular item before favorability scores can be determined. The location selector 514 can receive information from the sensors 502A-N and/or the WMS 500 about the storage item and available storage locations. For example, if the storage item can only be stored in cold storage areas, then the location selector 514 can receive, from the WMS 500, storage location information 542A-N identifying a temperature of each storage location. Only storage locations that are identified as cold storage can be identified as available storage locations for the particular storage item. A list of these locations can be generated by the selector 514 and provided to the location score determiner 516.

The location score determiner 516 can be configured to determine an aggregate favorability score for each available storage location for a storage item. The determiner 516 can include one or more determiners configured to assess and assign favorability sub-scores. The determiner 516 can then aggregate the sub-scores to identify an overall favorability score for each available storage location. For example, the location score determiner 516 can include a sizing sub-score determiner 518 (e.g., refer to 402-412 in FIGS. 4A-J), a weight sub-score determiner 520 (e.g., refer to 414-428 in FIGS. 4A-J), a travel time sub-score determiner 522 (e.g., refer to 430-438 in FIGS. 4A-J), a type sub-score determiner 524 (e.g., refer to 440-438 in FIGS. 4A-J), a picking rate sub-score determiner 526 (e.g., refer to 450-460 in FIGS. 4A-J), a fill capacity sub-score determiner 528 (e.g., refer to 462-468 in FIGS. 4A-J), a quantity moving sub-score determiner 530 (e.g., refer to 470-488 in FIGS. 4A-J), and a compatibility sub-score determiner 532 (e.g., refer to 490-498 in FIGS. 4A-J). One or more additional or fewer determiners can be included in the location score determiner 516. For example, the location score determiner 516 can have a determiner for each additional type of sub-score. In some examples, where only some sub-scores are used to determine an aggregate favorability score, only determiners associated with the selected sub-scores can be included in the location score determiner 516.

The instructions generator 534 can be configured to determine instructions for moving a storage item to a selected storage location. For example, once favorability scores are determined for each available storage location by the determiner 516, the location selector 514 can select the storage location having the most favorable score. Information associated with the selected storage location (e.g., the storage location information 542A-N) can be transmitted to the instructions generator 534. The generator 534 can also access information about the storage item, such as a current location of the item. Using such information, the generator 534 can determine a route and instructions for moving the item from its current location to the selected storage location. The generated instructions can be transmitted to one or more devices of workers in the warehouse (e.g., a worker tasked with moving the storage item to the selected storage location), an autonomous vehicle configured to move the storage item, and/or a mechanical conveyor moving system, as described herein.

Figure 6:
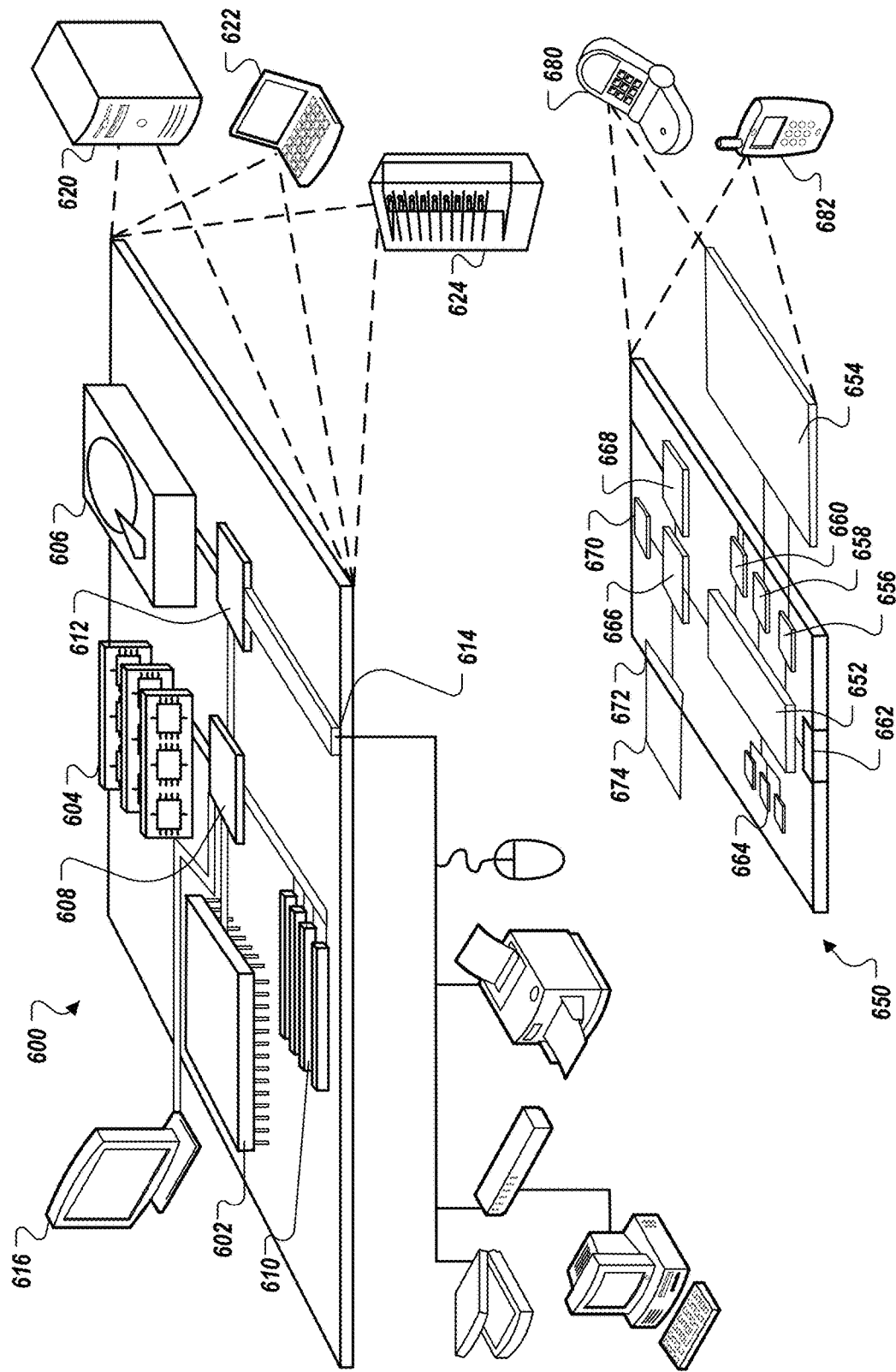
FIG. 6 is a block diagram of computing devices that may be used to implement the technology described herein.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method to store a physical item in a storage facility, the method comprising:
   receiving, by a computing system, a request to identify a destination location in the warehouse for a storage item;
   identifying, by the computing system, a set of available storage locations from among a plurality of storage locations in the warehouse;
   determining, by the computing system, a score for each respective storage location of the set of available storage locations based on multiple sub-scores specific to the respective storage location, to generate a set of scores corresponding to the set of available storage locations;
   selecting, by the computing system, a selected storage location from among the available storage locations based on the selected storage location having a most favorable score from among the set of scores corresponding to the set of available storage locations; and
   providing, by the computing system, instructions to cause a mechanical moving system to route the storage item to the selected storage location.

2. The computer-implemented method of claim 1, further comprising determining a sizing sub-score of the multiple sub-scores that are used to determine the score for each respective storage location of the available storage locations by:
   identifying, by the computing system, a size of the storage item;
   identifying, by the computing system, a size of the respective storage location;

determining, by the computing system, an amount that the size of the respective storage location is larger than the size of the storage item; and assigning, by the computing system, the sizing sub-score based on the amount that the size of the respective storage location is larger than the size of the storage item, wherein the size of the storage item falls within a range from a minimum size of the respective storage location to a maximum size of the respective storage location.

3. The computer-implemented method of claim 2, wherein the computing system is configured to assign a more favorable sizing sub-score when the size of the respective storage location is equal to the size of the storage item than when the size of the respective storage location is larger than the size of the storage item.

4. The computer-implemented method of claim 1, further comprising determining a weight sub-score of the multiple sub-scores that are used to determine the score for each respective storage location of the available storage locations by:

identifying, by the computing system, a weight of the storage item;

identifying, by the computing system, a maximum weight capacity of the respective storage location;

identifying, by the computing system, an aggregate weight of items currently stored at the respective storage location;

determining, by the computing system, a remaining weight capacity of the respective storage location based on a difference between the maximum weight capacity and the aggregate weight of the items currently stored at the respective storage location;

determining, by the computing system, an amount that the remaining weight capacity of the respective storage location exceeds the weight of the storage item; and assigning, by the computing system, the weight sub-score based on the amount that the remaining weight capacity of the respective storage location exceeds the weight of the storage item.

5. The computer-implemented method of claim 4, wherein the computing system is configured to assign a more favorable weight sub-score when the weight of the storage item is less than a predetermined threshold amount of weight of the remaining weight capacity of the respective storage location than when the weight of the storage item is greater than the predetermined threshold amount of weight.

6. The computer-implemented method of claim 4, wherein assigning the weight sub-score is based on items currently stored at the respective storage location having at least one of (i) a same type, or (ii) a same weight as the storage item.

7. The computer-implemented method of claim 1, further comprising determining a travel time sub-score of the multiple sub-scores that are used to determine the score for each respective storage location of the available storage locations by:

determining, by the computing system, a first projected travel time between a current location of the storage item and the respective storage location;

determining, by the computing system, a second projected travel time between the current location of the storage item and a second respective storage location; and assigning, by the computing system, a more favorable travel time sub-score when the first projected travel time is less than the second projected travel time than when the first projected travel time is greater than the second projected travel time.

8. The computer-implemented method of claim 7, wherein assigning the travel time sub-score is further based on (i) a wait time for storage items in a queue, (ii) a wait time for storage items at one or more lift mechanisms, (iii) a travel time for storage items in one or more lift mechanisms, (iv) a travel time for storage items through one or more mechanical moving systems, (v) an amount of traffic of storage items in the warehouse, (vi) an amount of time needed to pick the storage item after storage and deliver the storage item to a docking area, (vii) an amount of time needed to move the storage item from the respective storage location to a second destination in the warehouse, (viii) a quantity of items being currently stored at the respective storage location, (ix) an actual distance between the current location of the storage item and the respective storage location, or (x) an actual distance between the current location of the storage item and the second respective storage location.

9. The computer-implemented method of claim 1, further comprising determining, by the computing system, a type sub-score of the multiple sub-scores that are used to determine the score for each respective storage location of the available storage locations by:

identifying, by the computing system, a type of the storage item;

identifying, by the computing system, items having the same type as the storage item that are currently stored in locations in the warehouse;

determining, by the computing system, a quantity of storage items having the same type as the storage item at the respective storage location; and assigning, by the computing system, the type sub-score to the respective storage location based on the quantity of the items that have the same type at the respective storage location exceeding a threshold value.

10. The computer-implemented method of claim 9, wherein identifying items having the same type as the storage item comprises identifying items having at least one of a same perishable date, storage temperature, SKU, customer identifier, product, outbound date, and delivery date as the storage item.

11. The computer-implemented method of claim 1, further comprising determining, by the computing system, a picking rate sub-score of the multiple sub-scores that are used to determine the score for each respective storage location of the available storage locations by:

identifying, by the computing system, items currently stored in the respective storage location;

determining, by the computing system, a picking rate for each of the items currently stored in the respective location;

determining, by the computing system, a projected picking rate of the storage item; and assigning, by the computing system, the picking rate sub-score to the respective storage location based on the picking rate for each of the items currently stored at the respective storage location being less than the projected picking rate of the storage item.

12. The computer-implemented method of claim 11, wherein assigning the picking rate sub-score further comprises assigning a more favorable picking rate sub-score to the respective storage location when the projected picking rate of the storage item is greater than a second projected picking rate of a second storage item being routed to the respective storage location than when the projected picking rate of the storage item is less than or equal to the second projected picking rate of the second storage item being routed to the respective storage location.

13. The computer-implemented method of claim 1, further comprising determining, by the computing system, a fill capacity sub-score of the multiple sub-scores that are used to determine the score for each respective storage location of the available storage locations by:
   determining, by the computing system, a quantity of items currently stored at the respective storage location;
   determining, by the computing system and based on the quantity of items currently stored, a percent of fill capacity for the respective storage location; and
   assigning, by the computing system, the fill capacity sub-score based on the percent of fill capacity being less than a threshold value.

14. The computer-implemented method of claim 1, further comprising determining, by the computing system, a quantity moving sub-score of the multiple sub-scores that are used to determine the score for each respective storage location of the available storage locations by:
   receiving, by the computing system and from a plurality of sensors in the warehouse, information about items currently being moved in the warehouse;
   determining, by the computing system and based on the information about items currently being moved in the warehouse, a quantity of the items currently being moved in at least one of an aisle, the respective storage location, or the available storage locations; and
   assigning, by the computing system, the quantity moving sub-score based on the quantity of items being less than a threshold value.

15. The computer-implemented method of claim 14, wherein assigning the quantity moving sub-score is further based on (i) a number of items permitted in the aisle, the respective storage location, or the available storage locations at a given time, (ii) sizes of the items currently being moved in the aisle, the respective storage location, or the available storage locations, (iii) weights of the items currently being moved in the aisle, the respective storage location, or the available storage locations, (iv) types of the items currently being moved in the aisle, the respective storage location, or the available storage locations, or (v) a projected traffic time in the aisle, the respective storage location, or the available storage locations.

16. The computer-implemented method of claim 14, further comprising:
   receiving, by the computing system, real-time traffic conditions for the quantity of the items currently being moved; and
   adjusting, by the computing system, the quantity moving sub-score based on the real-time traffic conditions.

17. The computer-implemented method of claim 16, further comprising:
   determining, by the computing system, a first projected amount of time that the storage item would be stored in the respective storage location;
   determining, by the computing system and based on the real-time traffic conditions, a second projected amount of time to move the storage item to the respective storage location; and
   assigning, by the computing system, a more favorable quantity moving sub-score when the first projected amount of time being greater than the second projected amount of time than when the first projected amount of time is less than or equal to the second projected amount of time.

18. The computer-implemented method of claim 1, further comprising determining a compatibility sub-score of the multiple sub-scores that are used to determine the score for each respective storage location of the available storage locations by:
   identifying, by the computing system, a first set of characteristics about the storage item;
   identifying, by the computing system, a second set of characteristics about the respective storage location; and
   assigning, by the computing system, the compatibility sub-score based on one or more of the first set of characteristics being compatible with one or more of the second set of characteristics.

19. The computer-implemented method of claim 18, wherein the first set of characteristics include (i) a type of the storage item, (ii) a customer identification, (iii) a size of the storage item, (iv) a weight of the storage item, or (v) an amount of time for keeping the storage item in storage and the second set of characteristics include the respective storage location being (i) single deep, (ii) double deep, (iii) a drive-through rack, (iv) a drive-in rack, (v) automated, or (vi) manual.

20. The computer-implemented method of claim 18, wherein the compatibility sub-score is further based on (i) a quantity of forklifts moving items in the warehouse being greater than a first threshold value, (ii) a quantity of the available storage locations in the warehouse being greater than a second threshold value, (iii) a quantity of lift mechanism being greater than a third threshold value, (iv) a quantity of manual workers being greater than a fourth threshold value, or (iii) the warehouse being automated.

21. A system for storing a physical item in a storage facility, the system comprising:
   a plurality of storage locations in the storage facility;
   a mechanical moving system configured to route items to the plurality of storage locations; and
   a computing system configured to:
      receive a request to identify a destination location in the storage facility for a storage item;
      identify a set of available storage locations from among the plurality of storage locations in the facility;
      determine a score for each respective storage location of the set of available storage locations based on multiple sub-scores specific to the respective storage location to generate a set of scores corresponding to the set of available storage locations;
      select a selected storage location from among the available storage locations based on the selected storage location having a most favorable score from among the set of scores corresponding to the set of available storage locations; and
      provide instructions to cause the mechanical moving system to route the storage item to the selected storage location.

22. The system of claim 21, wherein the computing system is further configured to determine a sizing sub-score of the multiple sub-scores that are used to determine the score for each respective storage location of the available storage locations by:
   identifying a size of the storage item;
   identifying a size of the respective storage location;
   determining an amount that the size of the respective storage location is larger than the size of the storage item; and
   assigning the sizing sub-score based on the amount that the size of the respective storage location is larger than the size of the storage item, wherein the size of the storage item falls within a range from a minimum size of the respective storage location to a maximum size of the respective storage location.

23. The system of claim 21, wherein the computing system is further configured to determine a weight sub-score of the multiple sub-scores that are used to determine the score for each respective storage location of the available storage locations by:

identifying a weight of the storage item;

identifying a maximum weight capacity of the respective storage location;

identifying an aggregate weight of items currently stored at the respective storage location;

determining a remaining weight capacity of the respective storage location based on a difference between the maximum weight capacity and the aggregate weight of the items currently stored at the respective storage location;

determining an amount that the remaining weight capacity of the respective storage location exceeds the weight of the storage item; and assigning the weight sub-score based on the amount that the remaining weight capacity of the respective storage location exceeds the weight of the storage item.

\* \* \* \* \*

UNITED STATES PATENT AND TRADEMARK OFFICE
CERTIFICATE OF CORRECTION

PATENT NO. : 12,172,846 B2
APPLICATION NO. : 17/831379
DATED : December 24, 2024
INVENTOR(S) : Wintz et al.

Page 1 of 1

It is certified that error appears in the above-identified patent and that said Letters Patent is hereby corrected as shown below:

In the Claims

In Column 40, Line 32, in Claim 20, delete "(iii)" and insert -- (v) --, therefor.

Signed and Sealed this
Twenty-eighth Day of January, 2025

Coke Morgan Stewart
*Acting Director of the United States Patent and Trademark Office*